(12) United States Patent
Van Bosch et al.

(10) Patent No.: US 7,529,562 B2
(45) Date of Patent: May 5, 2009

(54) DEVICE AND METHOD FOR COMMUNICATING TELETYPE INFORMATION IN A VEHICLE COMMUNICATION SYSTEM

(75) Inventors: James A. Van Bosch, Crystal Lake, IL (US); Thomas A. Brey, Lake in the Hills, IL (US); Robert F. D'Avello, Lake Zurich, IL (US)

(73) Assignee: Temic Automotive of North America, Inc., Deer Park, IL (US)

( * ) Notice: Subject to any disclaimer, the term of this patent is extended or adjusted under 35 U.S.C. 154(b) by 544 days.

(21) Appl. No.: 11/199,711

(22) Filed: Aug. 9, 2005

(65) Prior Publication Data

US 2005/0277440 A1    Dec. 15, 2005

Related U.S. Application Data

(62) Division of application No. 10/376,917, filed on Feb. 28, 2003, now Pat. No. 6,983,171.

(51) Int. Cl.
*H04B 1/38* (2006.01)

(52) U.S. Cl. ..................................... 455/557
(58) Field of Classification Search .................. 455/99, 455/557
See application file for complete search history.

(56) References Cited

U.S. PATENT DOCUMENTS

| | | | |
|---|---|---|---|
| 4,471,165 A | 9/1984 | DeFino et al. | |
| 6,032,054 A | 2/2000 | Schwinke | |
| 6,075,841 A | 6/2000 | Engelke et al. | |
| 6,983,171 B2* | 1/2006 | Van Bosch et al. | 455/557 |
| 2004/0185800 A1* | 9/2004 | Van Bosch et al. | 455/99 |
| 2005/0277440 A1* | 12/2005 | Van Bosch et al. | 455/557 |
| 2006/0025085 A1* | 2/2006 | Van Bosch et al. | 455/99 |

* cited by examiner

*Primary Examiner*—William D Cumming

(57) ABSTRACT

A communication system and method for transmitting and receiving teletype information in a vehicle (20). The communication system (22) includes an external interface (24) and a communication control unit (26). The external interface (24), embedded in the vehicle (20), is capable of receiving a first set of teletype signals from a portable TTY terminal (50) and capable of sending a second set of teletype signal to the portable TTY terminal (50). The communication control unit (26), also embedded in the vehicle (20), is connected to the external interface (24) and comprises a controller (36) and a transceiver (34). The transceiver (34) is capable of transmitting messages over a wireless communication link (A) that contain information from the first set of teletype signals. The transceiver (34) is also capable of receiving messages over the wireless communication link (A) that contain information for the second set of teletype signals.

15 Claims, 15 Drawing Sheets

DEVICE AND METHOD FOR COMMUNICATING TELETYPE INFORMATION IN A VEHICLE COMMUNICATION SYSTEM

FIELD OF THE INVENTION

This invention in general relates to wireless communication systems in a vehicle and, more particularly, to a device and method in a vehicle that is capable of transmitting and receiving teletype information for physically impaired persons.

BACKGROUND OF THE INVENTION

Individuals who are deaf, sound impaired, and/or speech impaired are able to communicate over a telephone network through a Telecommunication Device for the Deaf (TDD) such as a text teletypewriter (TTY) terminal. To communicate, a person types his or her conversation on a keypad of a terminal. Each letter is transmitted by an electronic code called Baudot. Baudot code is a 45.45 bps binary frequency shift keyed scheme that is half duplex, and without error protection. Each bit has a nominal duration of 22 ms and a character consists of 1 start bit, 5 data bits, and 2 stop bits. A mark, or "1", is transmitted with a 1400 Hz tone. The space, or "0", is transmitted with an 1800 Hz tone. The electronic code is sent from the transmitting TTY terminal to a receiving TTY terminal over telephone lines in the form of tones. The receiving TTY terminal transforms the tones back to letters on a display screen. The conversation typed by the person at the transmitting TTY terminal may then be read on the display screen of the receiving TTY terminal.

A person can also use a computer with a TTY modem to communicate with someone who has a TTY terminal. Computers generally operate in American Standard Code for Information Interexchange (ASCII). To communicate with a TTY terminal, a person who uses ASCII must use an ASCII/Baudot modem and related software to convert the ASCII code into Baudot code.

Wireless service providers currently support the transmittal of TTY information for emergency (911) calls. This may be done through a handheld mobile cellular phone. A need currently exist, however, for providing a system and method that can handle teletype information and that can be easily integrated into vehicular communication systems, such as an embedded in-vehicle Telematics system. This would provide a significant benefit to physically impaired individuals who desire to use a portable TTY terminal in a vehicle.

It is, therefore, desirable to provide an improved wireless communications in vehicles and method to overcome or minimize most, if not all, of the preceding problems especially in the area of communications for physically impaired individuals.

Figure 1:
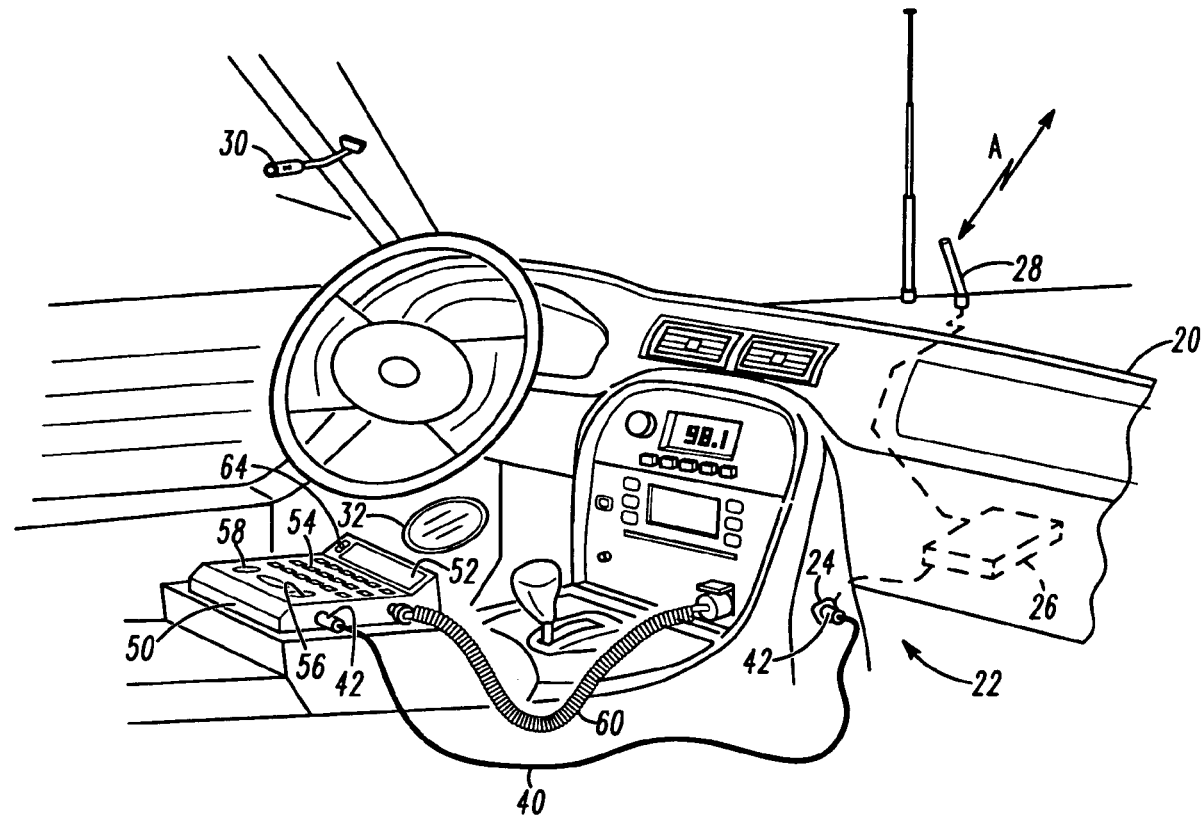
FIG. 1 is a perspective view of a communication system in a vehicle having the capability of transmitting and receiving teletype information according to one embodiment of the present invention.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the appended claims.

DETAILED DESCRIPTION

What is described is a system and method for transmitting and receiving teletype information in a vehicle. To this end, in one embodiment there is a communication system in a vehicle. The vehicular communication system includes an external interface and a communication control unit. The external interface, embedded in the vehicle, is capable of receiving a first set of teletype signals from a portable TTY terminal and capable of sending a second set of teletype signal to the portable TTY terminal. The communication control unit, also embedded in the vehicle, is connected to the external interface and comprises a controller and a transceiver. The transceiver is capable of transmitting messages over a wireless communication link that contain information from the first set of teletype signals. The transceiver is also capable of receiving messages over the wireless communication link that contain information for the second set of teletype signals.

In another embodiment, there is a communication system for a vehicle that comprises a communication control unit, an external interface, a removable communication cord, and a portable TTY terminal. The communication control unit and the external interface are embedded in the vehicle and connected to each other. The removable communication cord is connected between the external interface and the portable TTY terminal. The portable TTY terminal has at least a keypad and a display and is capable of sending a first set of teletype signals and capable of receiving a second set of teletype signals. These teletype signals are communicated to and from the communication control unit over the removable communication cord. Accordingly, the communication control unit is capable of receiving the first set of teletype signals from the portable TTY terminal and is capable of sending the second set of teletype signals to the portable TTY terminal.

In one embodiment, the removable communication cord includes a first audio wire, a second audio wire, and a ground wire. In another embodiment, the communication cord may further include a control wire and/or a power wire. An operational mode switch may be embedded in the portable TTY terminal or in the vehicle to provide the operator with the option to select a set of operational modes such as a normal teletype mode, a voice carry over mode, and a hearing carry over mode. In the normal teletype mode, the user may provide information for the first set of teletype signals through the keypad of the portable TTY terminal. The user may also receive information from the second set of teletype signals through the display of the portable TTY terminal. In the voice carry over mode, any audio information for a conversation may be provided by the user through a microphone in the portable TTY terminal or through a microphone embedded in the vehicle. In the hearing carry over mode, the user may hear any audio information for a conversation though a speaker in the portable TTY terminal or through a speaker embedded in the vehicle.

There is also a method for establishing a wireless communication link between a vehicle and a remote station that comprises the steps of: determining, by the vehicle, whether an occupant of a vehicle desires to establish a wireless communication link with a remote station; establishing, by the vehicle, the wireless communication link between the vehicle and the remote station after it is determined that an occupant desires to establish the wireless communication link; transmitting, by the remote station, a first message to the occupant of the vehicle, the first message including a voice communication; waiting, by the remote station, for a response message from the occupant of the vehicle during a first period of time, the response message including a voice communication; and if no response message is received from the occupant of the vehicle during the first period of time, transmitting, by the remote station, a second message to the occupant of the vehicle, the second message including teletype information. The method may also comprise the steps of: receiving, by the vehicle, the second message to the occupant of the vehicle; converting, by the vehicle, the teletype information in the second message to a set of teletype signals; and transmitting, by the vehicle, the set of teletype signals to a portable TTY terminal. The method may further comprise the step of: waiting, by the remote station, for a teletype response message from the occupant of the vehicle during a second period of time, the teletype response message including teletype information.

Another embodiment includes a method in a vehicle communication system for establishing a wireless communication link between the vehicle communication system and a remote station. The method comprises the steps of: sending a user prompt from the vehicle communication system to a portable TTY terminal; determining at the vehicle communication system whether a user input is received from the portable TTY terminal; if a user input is received from the portable TTY terminal, determining whether the user input includes a dial command; if the user input includes a dial command, establishing the wireless communication link between the vehicle communication system and the remote station. The method may further comprise the steps of: determining whether the dial command includes a telephone number; and if the dial command includes a telephone number, establishing the wireless communication link between the vehicle communication system and the remote station based on the telephone number included in the dial command.

There are also methods that include steps such as: determining at the vehicle communication system whether an incoming data message exists, determining at the vehicle communication system whether an incoming call exists, and determining at the communication system whether a vehicle alert exits. Based on those determinations, the vehicle communication system may communicate with the portable TTY terminal in a variety of ways.

Now, turning to the drawings, FIG. 1 is a perspective view of the cabin of a vehicle 20 having a communication system 22. In one embodiment, the communication system 22 may include an external interface 24, a communication control unit 26, an antenna 28, a microphone 30, and a speaker 32. The communication control unit 26 is embedded in the vehicle 20 and may be generally directed to providing Telematics services to an occupant of the vehicle 20.

The communication control unit 26 is connected to the antenna 28 in order to provide wireless communications over a wireless communication link A with a remote station (not shown). The remote station may be a Telematics related service center or other remote device. The communication control unit 26 may have a transceiver that is capable of establishing and accepting voice calls through the antenna 28 and over the wireless communication link A. For instance, the transceiver in the communication control unit 26 may be a cellular transceiver and operate according to an analog wireless communication protocol such as the Advanced Mobile Phone System (AMPS) or operate according to a digital wireless communication protocol such as a Code Division Multiple Access (CDMA) protocol, a Time Division Multiple Access (TDMA) protocol, or the Global System for Mobile Communications (GSM) protocol. Moreover, the transceiver may operate according to one of several types of bearer services to transmit data between the communication control unit 26 and the remote station such as general packet radio service (GPRS), short message service (SMS), circuit switched data service (CSD), or high-speed circuit switched data service (HSCSD).

Figure 15:
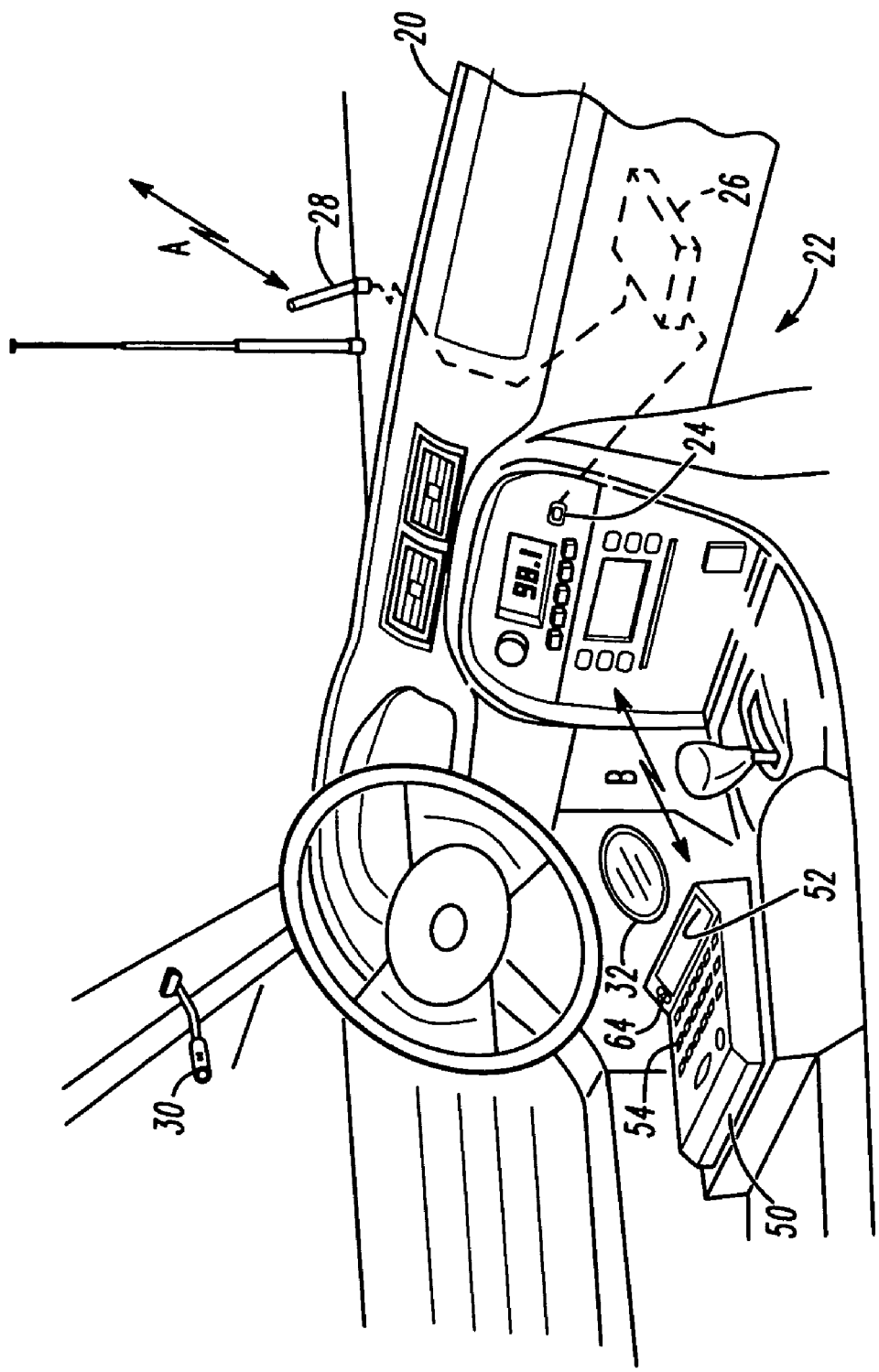
FIG. 15 is a perspective view of yet another embodiment of a communication system in a vehicle having the capability of transmitting and receiving teletype information.
Figure 16:
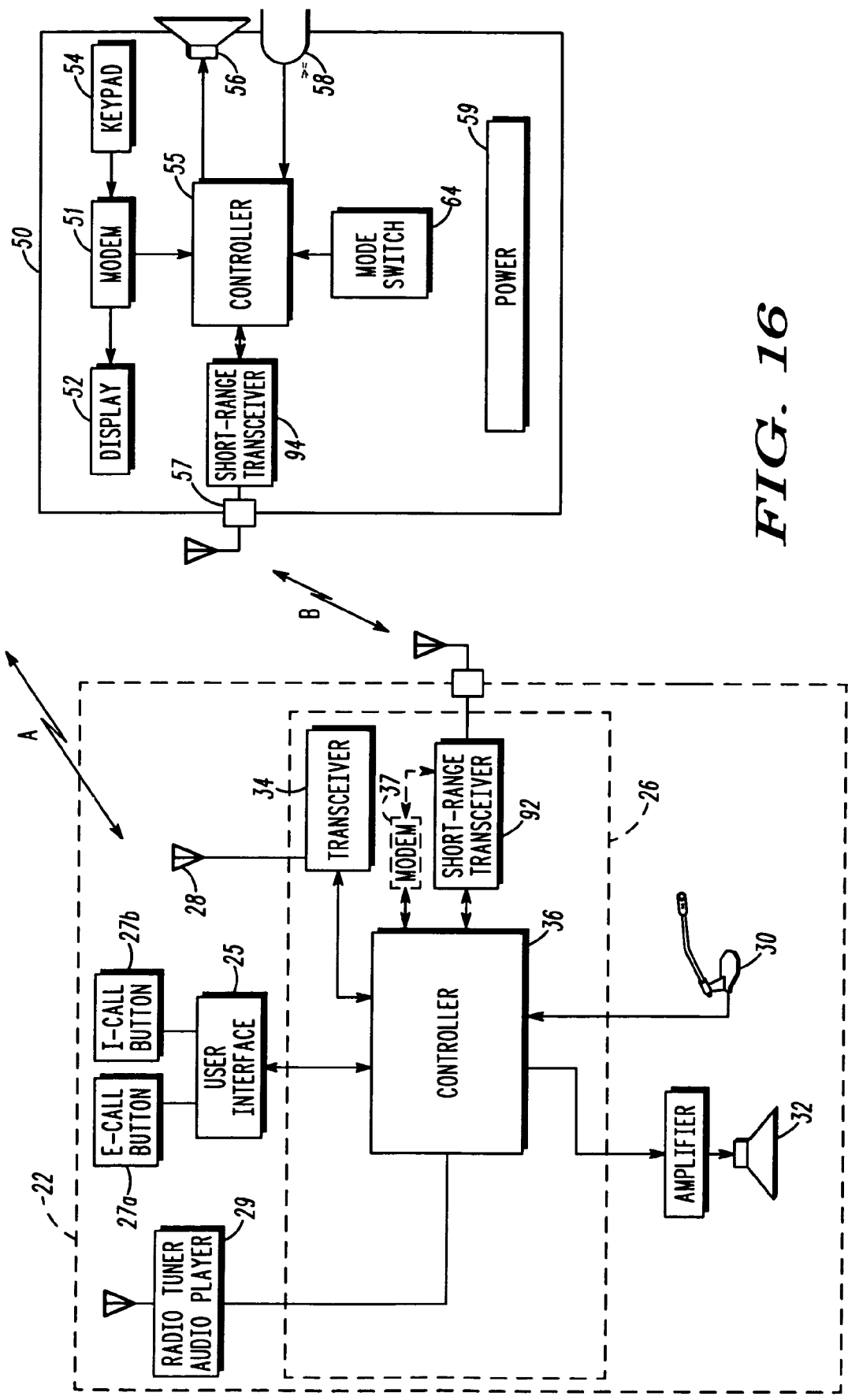
FIG. 16 is a block diagram of one embodiment of the system shown in FIG. 15.

The present invention is directed to an improved communication system in a vehicle that is further capable of transmitting and receiving teletype information for physically impaired individuals. Accordingly, the communication system 22 of the present invention includes an external interface 24 that is embedded in the vehicle 20. As will be explained in more detail below, the main purpose of the external interface 24 will be to receive a first set of teletype signals from a portable TTY terminal 50 and to send a second set of teletype signals to the portable TTY terminal 50. In one embodiment, the external interface 24 is a wired connection as shown in FIGS. 1-5, 11-14. In another embodiment, the external interface 24 is a wireless connection as shown in FIGS. 15 and 16. In a further embodiment, the external interface 24 includes the vehicle microphone 30 and vehicle speakers 32. In that case, the teletype signals are transferred over the air to the portable TTY terminal 50 through sound waves.

Figure 2:
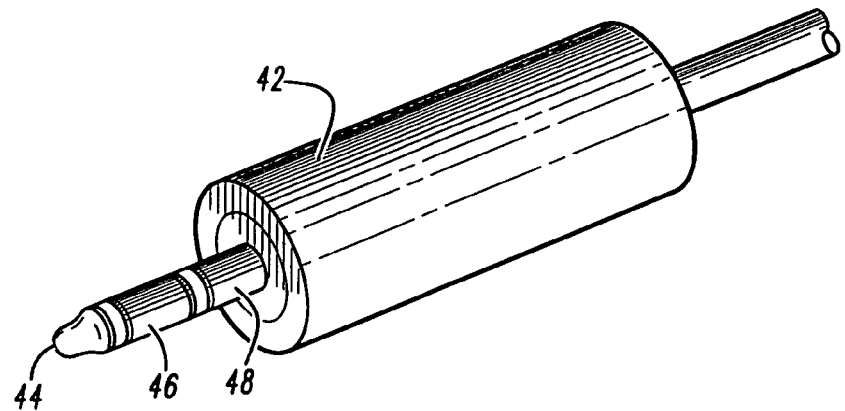
FIG. 2 is a perspective view of one embodiment of a connector that may be used in the system shown in FIG. 1.

Referring to FIGS. 1-5, in one embodiment, a first set of teletype signals and a second set of teletype signals are transferred between the communication system 22 and the portable TTY terminal 50 via a removable communication cord 40 having end connectors 42. FIG. 2 shows one embodiment of a suitable end connector 42 similar to a 2.5 mm jack connector. In this embodiment, the connector 42 may have three electrical contacts 44, 46, 48. The electrical contacts 44, 46, 48 are connected to wires 45, 47, 49 (see FIGS. 3, 4) in the removable communication cord 40.

The first electrical contact 44 may be located at the tip of the connector 42 and may provide for the transfer of the first set of teletype signals from the portable TTY terminal 50 to the vehicle communication system 22 via the wire 45 in the communication cord 40. The vehicle communication system 22 receives the teletype signals and generates messages over the wireless communication link A that contain the Baudot tones or other information representative of the tones.

The second electrical contact 46 may be located in the middle of the connector 42 and may provide for the transfer of the second set of teletype signals from the communication system 22 to the portable TTY terminal 50 via the wire 47 in the communication cord 40. The portable TTY terminal 50 may then extract the information contained in the second set of teletype signals and generate text for output to the user on display 52.

The third electrical contact 48 may be located at an inner location of the connector 42, opposite the tip, and may provide a ground connection for the portable TTY terminal 50 via the wire 49 in the communication cord 40.

Figure 3:
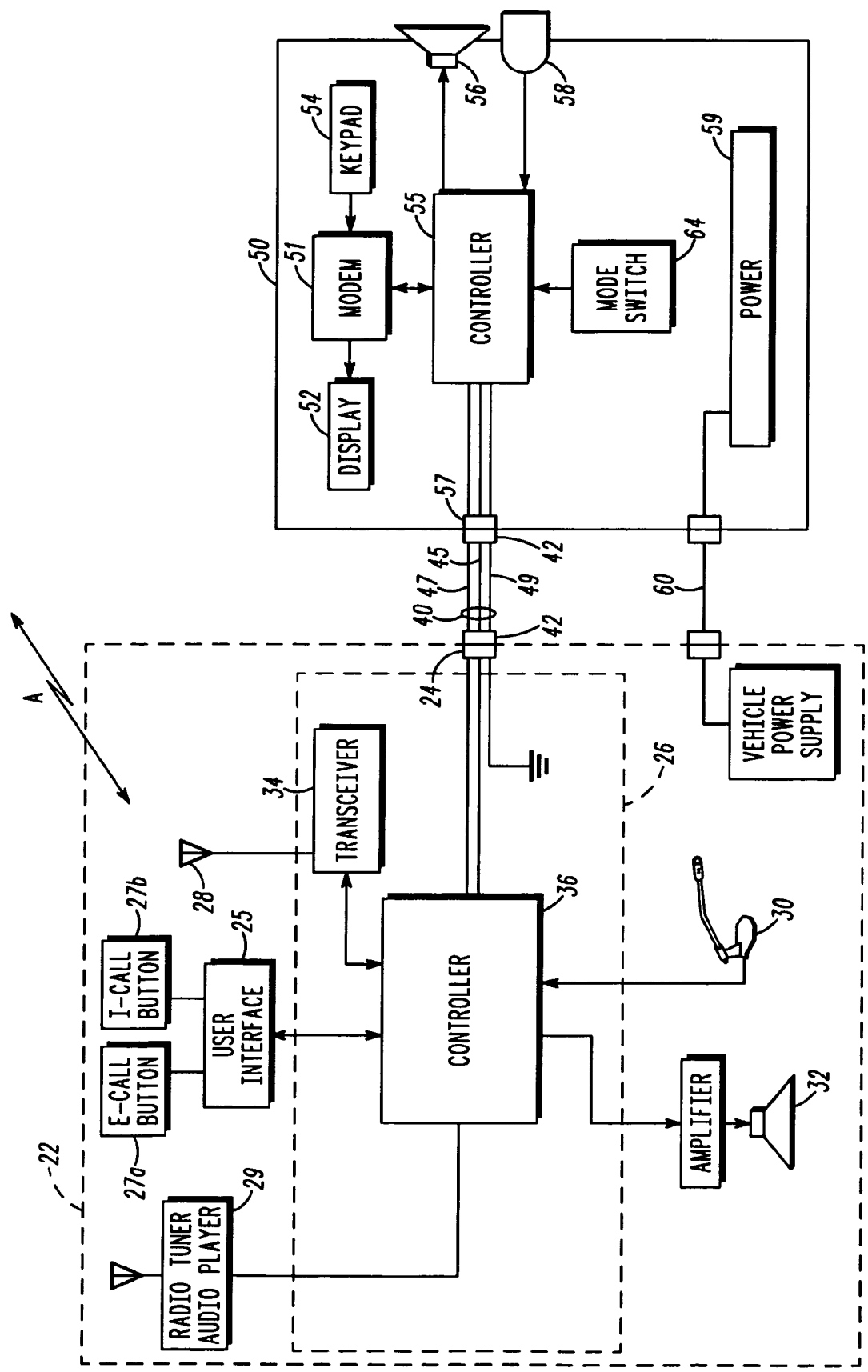
FIG. 3 is a block diagram of one embodiment of the system shown in FIG. 1.
Figure 4:
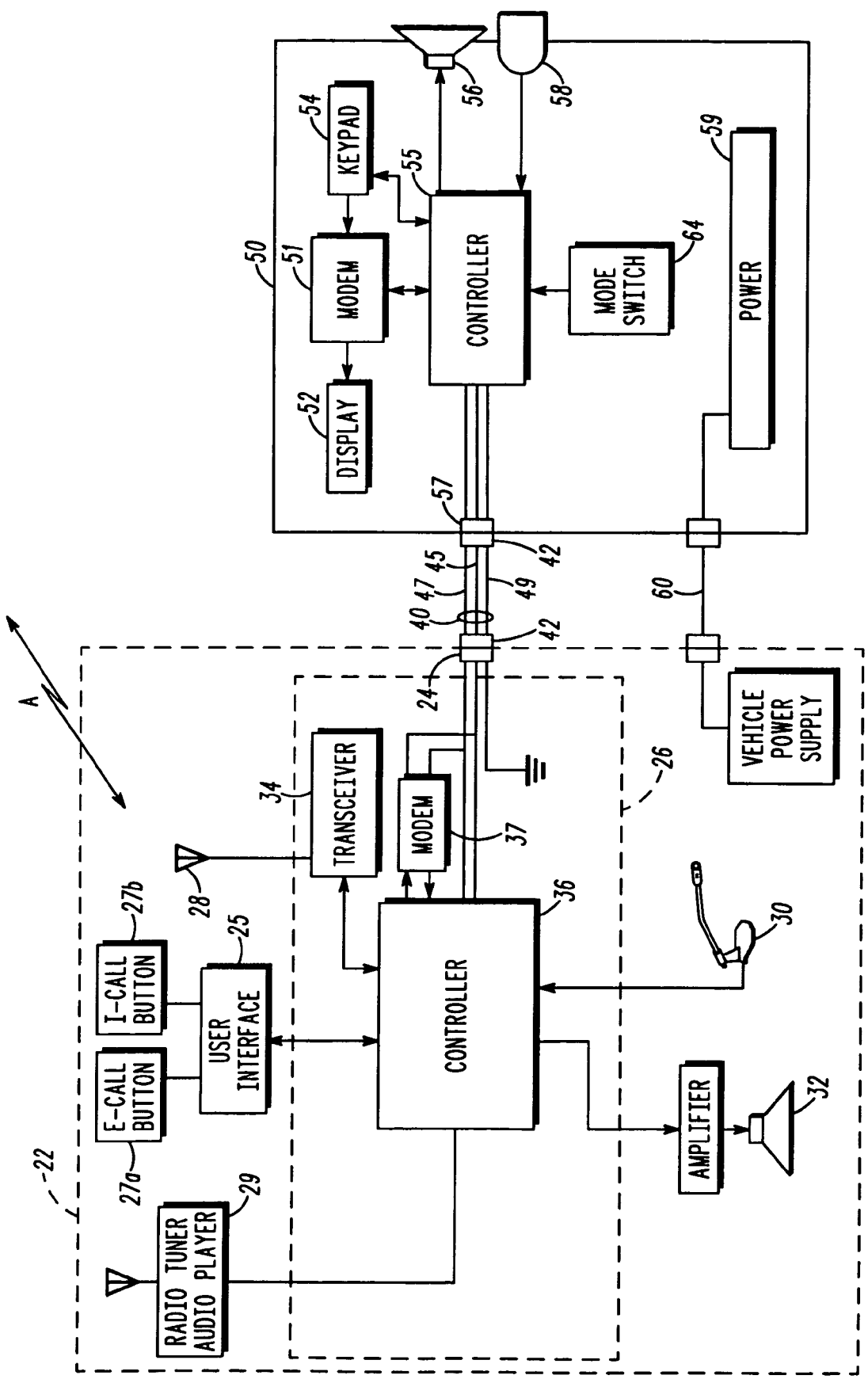
FIG. 4 is a block diagram of another embodiment of the system shown in FIG. 1.

As will be illustrated in more detail below, the difference between FIG. 3 and FIG. 4 is that the vehicle communication system 22 shown in FIG. 4 includes a modem 37. The addition of a modem 37 to the vehicle communication system 22 enables a vehicle controller 36 to receive and transmit control information with a controller 55 in the portable TTY terminal 50. This may be important in some applications where a desire exists to allow the controller 55 in the portable TTY terminal 50 to inform the vehicle controller 36 of a particular mode of operation, as will be explained in more detail below. Another application may include allowing the controller 55 in the portable TTY terminal 50 to inform the vehicle controller 36 when to establish a wireless communication link A. A further application may include allowing the controller 55 in the portable TTY terminal 50 to inform the vehicle controller 36 of a particular telephone number to use when attempting to establish a wireless communication link A.

Figure 5:
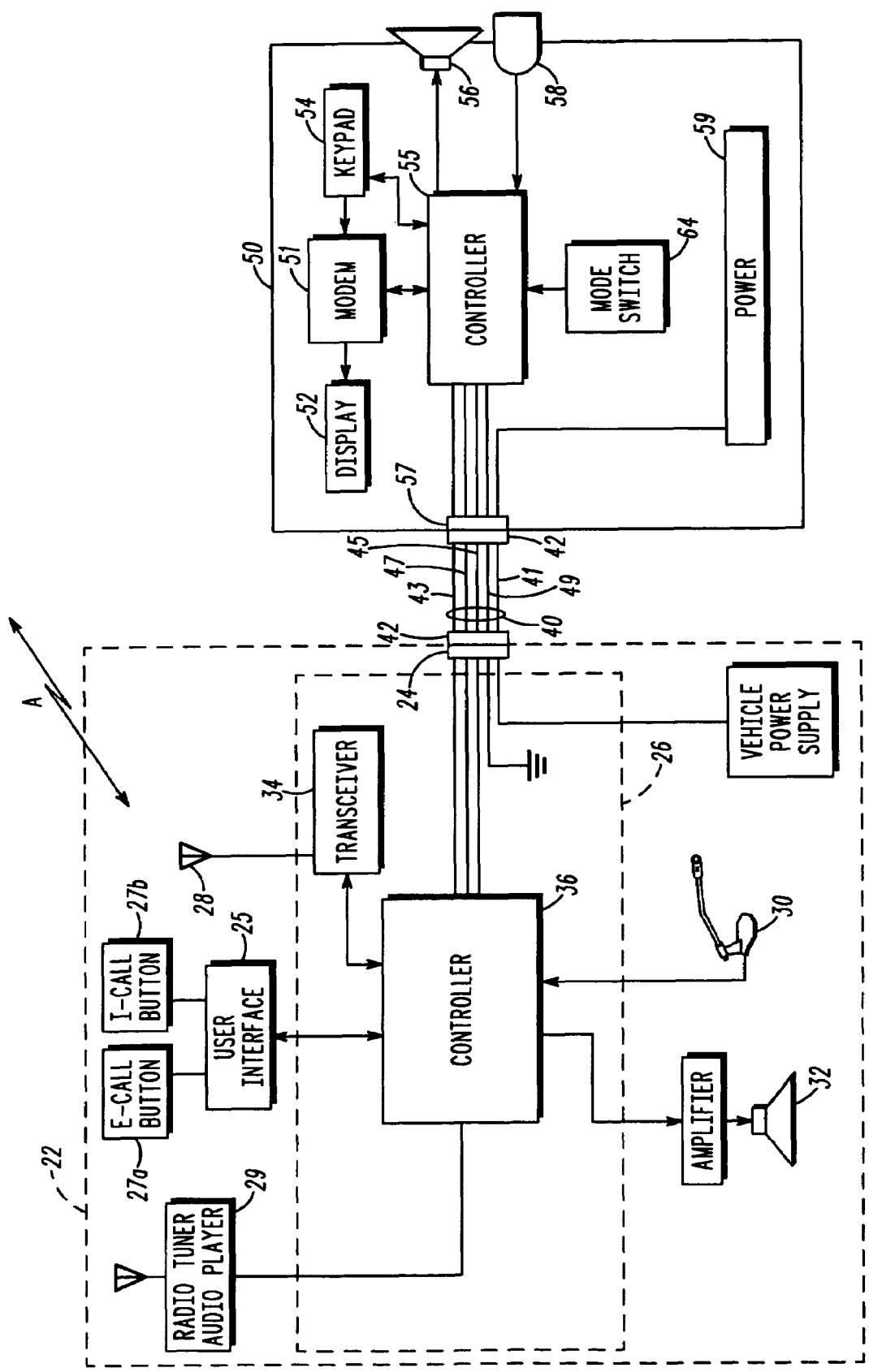
FIG. 5 is a block diagram of a further embodiment of the system shown in FIG. 1.

In another embodiment of the present invention, referring to FIG. 5, the connector 42 may further include other electrical contacts or pins for control and/or power. For instance, the communication cord 40 may have an additional wire 43 for a serial connection for the transfer of control signals between the controller 55 in the portable TTY terminal 50 and the controller 36 in the vehicle communication system 22. As mentioned previously, this may be beneficial in applications where the controller 55 in the portable TTY terminal 50 would like to inform the vehicle controller 36 of a particular mode of operation, when to establish the wireless communication link A, or specific information regarding how to establish the wireless communication link A.

The present invention advantageously allows a user of a portable TTY terminal 50, also known as a Telecommunication Device for the Deaf (TDD), to transmit and receive teletype signals through a communication system 22 in a vehicle 20. As will be explained in more detail below, in one embodiment, the portable TTY terminal 50 may include a modem 51, a display 52, a keypad 54, a controller 55, a speaker 56, a microphone 58, and an external interface 57. The portable TTY terminal 50 may further have an internal power supply 59 (such as a battery) and/or a connector for receiving power from the vehicle 20 through a power cord 60. The portable TTY terminal 50 may also have a mode selector switch 64 that is configured to allow a user to operate the portable TTY terminal 50 in three modes: a normal TTY mode, a Voice Carry Over (VCO) mode, and a Hearing Carry Over (HCO) mode.

In one embodiment, where the communication cord 40 allows for the communication of analog signals, the operation of the portable TTY terminal 50 in the normal TTY mode would allow a user to provide text for a conversation through the keypad 54 of the portable TTY terminal 50. The text entered into the keypad 54 may then be converted into a set of teletype signals by the modem 51 and then transferred to interface 57 for communication to the vehicle communication system 22 over the wire 45 in the communication cord 40. The normal TTY mode would also allow a user to read text of the conversation through the visual display 52 of the portable TTY terminal 50. The text shown on the visual display 52 may come from the modem 51 after the interface 57 of the portable TTY terminal 50 receives a set of teletype signals over the wire 47 in the communication cord 40.

The VCO mode may be a communication hybrid of TTY and voice. In particular, the operation of the portable TTY terminal 50 in VCO mode would allow a hearing impaired user to provide audio information through the audio input or microphone 58 of the portable TTY terminal 50. The audio information would be transmitted from the portable TTY terminal 50 to the vehicle communication system 22 over the wire 45 in the communication cord 40. The controller 55 can do this by connecting the external interface 57 to the terminal's microphone 58. Alternatively, in embodiments where the communication cord 40 allows the transmission of control information, the VCO mode may allow a user to provide audio information to the transceiver 34 through the microphone 30 embedded in the vehicle 20. The controller 55 can do this by sending a control signal to the controller 36 in the vehicle communication system 22 so that the input to the transceiver 34 is the vehicle's embedded microphone 30. The VCO mode may also allow a user to read text of the conversation through the visual display 52 of the portable TTY terminal 50. The text shown on the visual display 52 may come from the modem 51 after the interface 57 of the portable TTY terminal 50 receives the set of teletype signals over the wire 47 in the communication cord 40. Individuals who can speak clearly but have a difficult time hearing may prefer the VCO mode.

The HCO mode allows a speaking impaired user to type their words on the keypad 54 of the TTY terminal 50 but allow the person to hear the call takers spoken response through an audio output or speaker. In particular, the hearing carry over mode may allow a user to provide text for a conversation through the keypad 54 of the portable TTY terminal 50. The text entered into the keypad 54 may then be converted into a set of teletype signals by the modem 51 and then transferred to interface 57 for communication to the vehicle communication system 22 over the wire 45 in the communication cord 40. The HCO mode would also allow a user to receive audio information through the speaker 56 of the portable TTY terminal 50. The audio information would be transmitted to the portable TTY terminal 50 from the vehicle communication system 22 over the wire 47 in the communication cord 40. The controller 55 can do this by connecting the output from the external interface 57 to the terminal's speaker 56. Alternatively, in embodiments where the communication cord 40 allows the transmission of control information, the HCO mode may allow a user to receive audio information through the speakers 32 embedded in the vehicle 20. The controller 55 can do this by sending a control signal to the controller 36 in the vehicle communication system 22 so that the output from the transceiver 34 is directed to the vehicle's embedded speakers 32. Individuals with speech impairments who are not deaf or hard of hearing may prefer the HCO mode.

Figure 6:
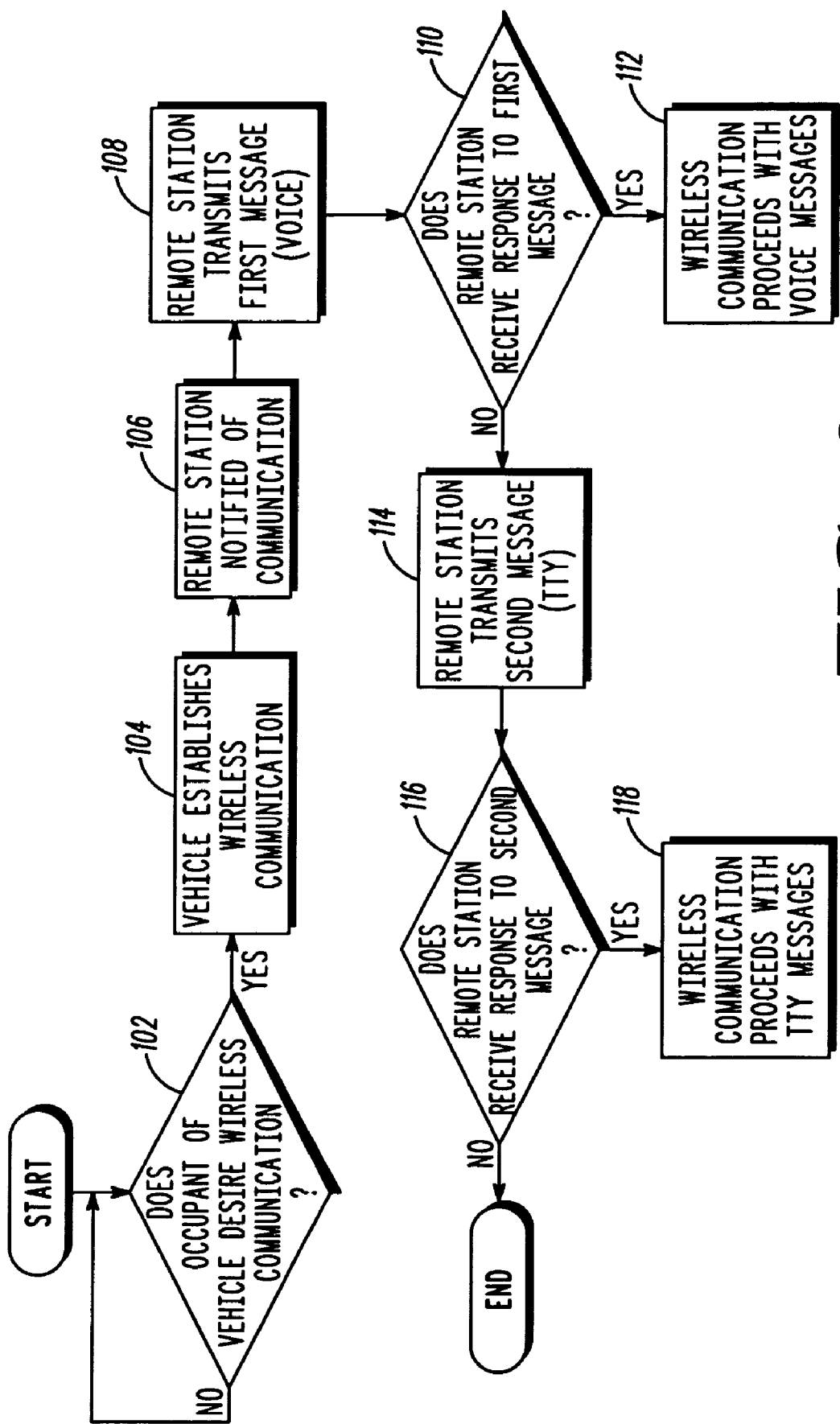
FIG. 6 is a flow diagram of a method for establishing a wireless communication link between a vehicle and a remote station.

With respect to the embodiment in FIG. 1, the interaction between the vehicle and a remote station will now be further explained in the context of the system diagrams in FIGS. 3-5 and the flow diagram in FIG. 6. FIGS. 3-4 illustrate a portable TTY terminal 50 that communicates with a vehicle communication system 22 through a removable communication cord 40 having a first wire 45, a second wire 47, and a ground wire 49. FIG. 5 illustrates a portable TTY terminal 50 that communicates with a vehicle communication system 22 through a removable communication cord 40 having at least a first wire 45, a second wire 47, a ground wire 49, a control wire 43, and a power wire 41.

Initially, in decision block 102, the vehicle controller 36 may determine whether an occupant of the vehicle 20 desires to establish a wireless communication link A with a remote station. In one embodiment, the vehicle controller 36 makes this determination by monitoring call buttons 27a, 27b. In particular, a user of the portable TTY terminal 50 that desires to establish a wireless communication link A with a remote station may begin a conversation by selecting the call buttons 27a, 27b on a user interface 25 in the vehicle 20. The call buttons 27a, 27b may be part of a Telematics application that initiates an emergency call (E-Call) or an information call (I-Call) via a wireless communication link A. The vehicle controller 36 may also make this determination through a voice recognition system or other user input means in the vehicle 20.

The vehicle controller 36 may also make the determination in decision block 102 from control information received from the portable TTY terminal 50. This would apply to the embodiments illustrated in FIGS. 4-5, and described in more detail below with respect to FIGS. 7-10. In particular, a user of the portable TTY terminal 50 may begin a conversation by selecting a predetermined set of keys on the keypad 54 of the TTY terminal 50. The controller 55 in the portable TTY terminal 50 would recognize the predetermined set of keys and then send control information to the vehicle's controller 36 to establish a wireless communication link A. In one embodiment, referring to FIG. 4, the portable TTY terminal 50 could transmit the control information in the form of Baudot tones from its internal modem 51 over wire 45 in the communication cord 40 to the vehicle modem 37. The vehicle modem 37 would then convert the tones to a format type capable of being read and understood by the vehicle controller 36. In another embodiment, referring to FIG. 5, the portable TTY terminal 50 could transmit the control information in the form of control signals over control wire 43 in the communication cord 40.

Referring to process block 104, after it is determined that the occupant of a vehicle 20 would like to establish a wireless communication link A, then the vehicle controller 36 will establish the wireless communication link A with the remote station. This may be accomplished through the use of a transceiver 34 that is capable of establishing wireless links with the remote station using an analog or digital wireless communication protocol.

In process block 106, the service center is notified that the vehicle 20 has established a wireless communication link A and is requesting a response from the service center.

In process block 108, an operator at a service center may respond by transmitting a first message to the vehicle 20. The first message would include a voice communication under a normal Telematics application. The process proceeds to decision block 110 where the service center will wait for a time period while determining whether a response has been received from the vehicle 20 to the first message. In process block 112, if the service center receives a response to the first message, then the service center may proceed with the communication as a voice call and provide the operator of the vehicle 20 with the requested Telematics services. If there is no response to the first message, however, then the process may proceed to block 114.

At process block 114, the service center may then attempt to query the vehicle 20 by sending a second message that contains teletype (TTY) information to the vehicle 20. In one embodiment, the Baudot tones are transmitted directly to the vehicle 20 via messages in a voice call. It is noted, however, that the transmittal and receipt of Baudot tones through present digital mobile systems may result in distorted tones. The Telecommunication Industry Association (TIA) has coordinated efforts to find solutions to improve the signaling over wireless communication links. For instance, the TIA has generated an interim standard entitled "TTY/TDD Extension to TIA/EIA 136-410 Enhanced Full Rate Speech Codec," TIA/EIA/IS-823, May 2000. That standard provides details on extending the current Vocoder standard to transport TTY/TDD 45.45 bps and 50 bps Baudot code. Accordingly, in a second embodiment, the transmission of the messages containing teletype information over wireless communication link A is done according to this standard.

When receiving messages, the vehicle transceiver 34 and/or the vehicle controller 36 may be configured to detect the presence of teletype information. If teletype information is detected in the message, in one embodiment where the tones are simulated in digital messages, a decoder in the transceiver 34 may be used to receive the messages and regenerate the Baudot tones corresponding to the characters at the specified rates. The Baudot tones for the message would then be sent via a set of teletype signals through the vehicle's external interface 24, over the wire 47 in the communication cord 40, to the portable TTY terminal 50. The modem 51 in the portable TTY terminal 50 would then receive the incoming set of teletype signals and generate a text message that can be viewed over the display 52 of the terminal 50.

The process then proceeds to decision block 116 where the service center waits another period of time to determine whether a response was received from the vehicle 20 to the second message. If the vehicle system is operating in the TTY normal mode, the user may respond by entering text of a conversation through the keypad 54 in the portable TTY terminal 50. The modem 51 processes the information and generates a set of teletype signals reflective of the characters of the text message entered by the user through the keypad 54. The teletype signals may be in the form of Baudot tones that are transmitted through the external interface 57 of the TTY terminal 50 and over the wire 45 in the communication cord 40.

The communication system 22 receives, through its interface 24, the set of teletype signals generated by the portable TTY terminal 50. The vehicle controller 36 and/or the transceiver 34 can be configured to detect the presence of the teletype signals generated by the portable TTY terminal 50. Thereafter, the transceiver 34 transmits messages over the wireless communication link A. The messages may include the Baudot tones themselves or generated messages that are representative of information contained in the set of teletype signals received from the portable TTY terminal 50. For instance, in the later case of generated messages representative of the tones, the transceiver 34 may include an encoder that detects the presence of Baudot tones from the portable TTY terminal 50. After detection, the encoder may be configured to buffer the incoming frames to detect the teletype character that the user is attempting to transmit. The encoder may then generate and transmit a message over the wireless communication link A to the remote station that is representative of the information contained in the teletype signals. The message may include a header, character information, the baud rate, and any other processing information over the wireless communication link A to the remote station. At the remote station, a decoder may be used to receive the message and regenerate the Baudot tones corresponding to the character at the specified rate.

In process block 118, if the service center receives a response to the second message, then the service center may proceed with the communication with teletype (TTY) messages and provide the operator of the vehicle 20 with the requested Telematics services. If there is no response to the second message, however, then the process may proceed with further queries from the service center to the vehicle 20 or, alternatively, the process may end.

For incoming communications to the vehicle 20, the controller 36 in the vehicle communication system 22 is configured to monitor the cellular transceiver 34 for pending incoming cellular communications. Upon receiving a pending communication, the controller 36 may be configured to notify the occupant of the vehicle 20 of a pending communication via an audio or visual alert. The controller 36 will then determine whether the vehicle occupant will agree to accept the communication. In one embodiment, the controller 36 may make this determination by waiting for a predetermined time period to detect whether the occupant selects a button on the portable TTY terminal 50. If the pending incoming voice communication is not accepted, then the controller 36 can do nothing and let the communication transfer to an electronic answering service. Alternatively, the controller 36 can respond to the voice communication by sending a special TTY text message to the incoming caller that the occupant of the vehicle is not able to respond to the call at this time.

If the controller 36 determines that the pending incoming voice communication is accepted, then the controller 36 may switch, transfer or otherwise route the downlink communication to the portable TTY terminal 50 similar to the process described above after the vehicle occupant has established a wireless communication link A.

The process described above may need to be modified depending on the operational mode selected by the user. For instance, if the user desires to operate the portable TTY terminal 50 in the normal TTY mode, then a set of teletype signals may be transferred from the portable TTY terminal 50 to the vehicle communication system 22 through the wire 45 in the communication cord 40. The teletype signals in this case would be generated by the modem 51 in the portable TTY terminal 50 after text is entered by the user through the keypad 54. Another set of teletype signals may be transferred from the vehicle communication system 22 to the portable TTY terminal 50 through the wire 47 in the communication cord 40. The teletype signals in that case would be generated from the transceiver 34 in the vehicle communication system 22 after messages with teletype information are received over wireless communication link A.

If, however, the user desires to operate the portable TTY terminal 50 in the VCO mode, the portable TTY terminal 50 may then transmit the audio information received through the terminal's microphone 58 over the wire 45 in the communication cord 40. Alternatively, referring to FIGS. 4 and 5, a control message may be sent to the communication system 22 that instructs the system to connect the audio information received through the vehicle's microphone 30 to the transceiver 34 for conversations over wireless communication link A. In the VCO mode, the teletype signals received by the portable TTY terminal 50 over the wire 47 in the communication cord 40 would still be capable of being viewed through the display 52.

If the user desires to operate the portable TTY terminal 50 in the HCO mode, the portable TTY terminal 50 may then route the downlink audio information received from the communication system 22 to the terminal's speaker 56 over the wire 47 in the communication cord 40. Alternatively, a control message may be sent to the communication system 22 that instructs the system to connect the downlink audio information from the transceiver 34 to the vehicle's audio speakers 32. In the HCO mode, the teletype signals generated by the modem 51 would still be sent from the portable TTY terminal 50 to the vehicle communication system 22 over the wire 45 in the communication cord 40.

One of the benefits of the present invention can be further illustrated with regard to the processes illustrated in FIGS. 7-10. In particular, FIGS. 7-10 illustrate processes in the vehicle controller 36 based on the transfer of control information between the communication control unit 26 and the portable TTY terminal 50. As mentioned above, referring to FIG. 4, the portable TTY terminal 50 may be configured to transmit the control information in the form of Baudot tones from its internal modem 51 over wire 45 in the communication cord 40 to the vehicle modem 37. The vehicle modem 37 would then convert the tones to a format type capable of being read and understood by the vehicle controller 36. In another embodiment, referring to FIG. 5, the portable TTY terminal 50 could transmit the control information in the form of control signals over control wire 43 in the communication cord 40.

Figure 7:
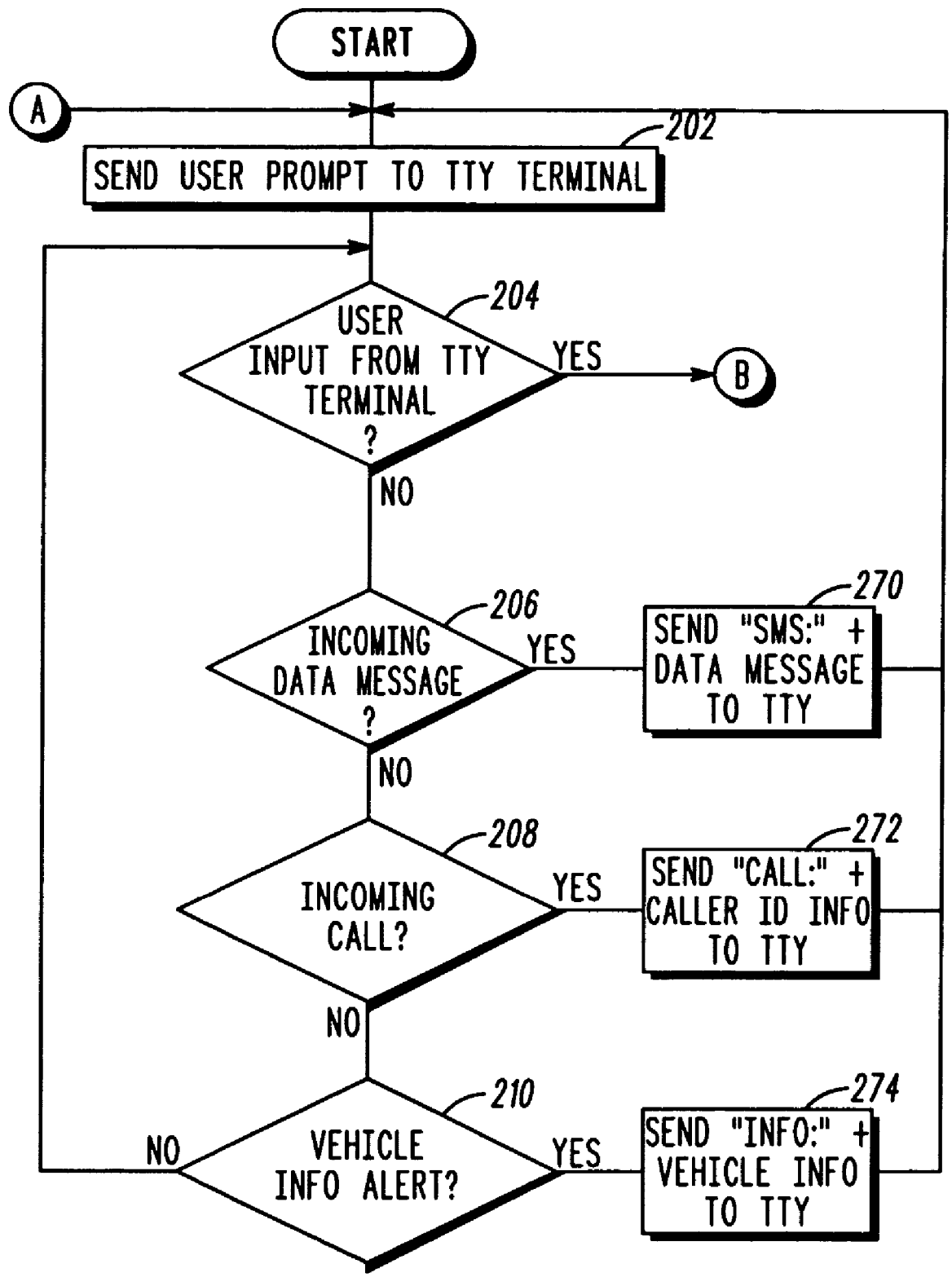
FIGS. 7-10 are flow diagrams of a method for communicating teletype information in a vehicle communication system.
Figure 8:
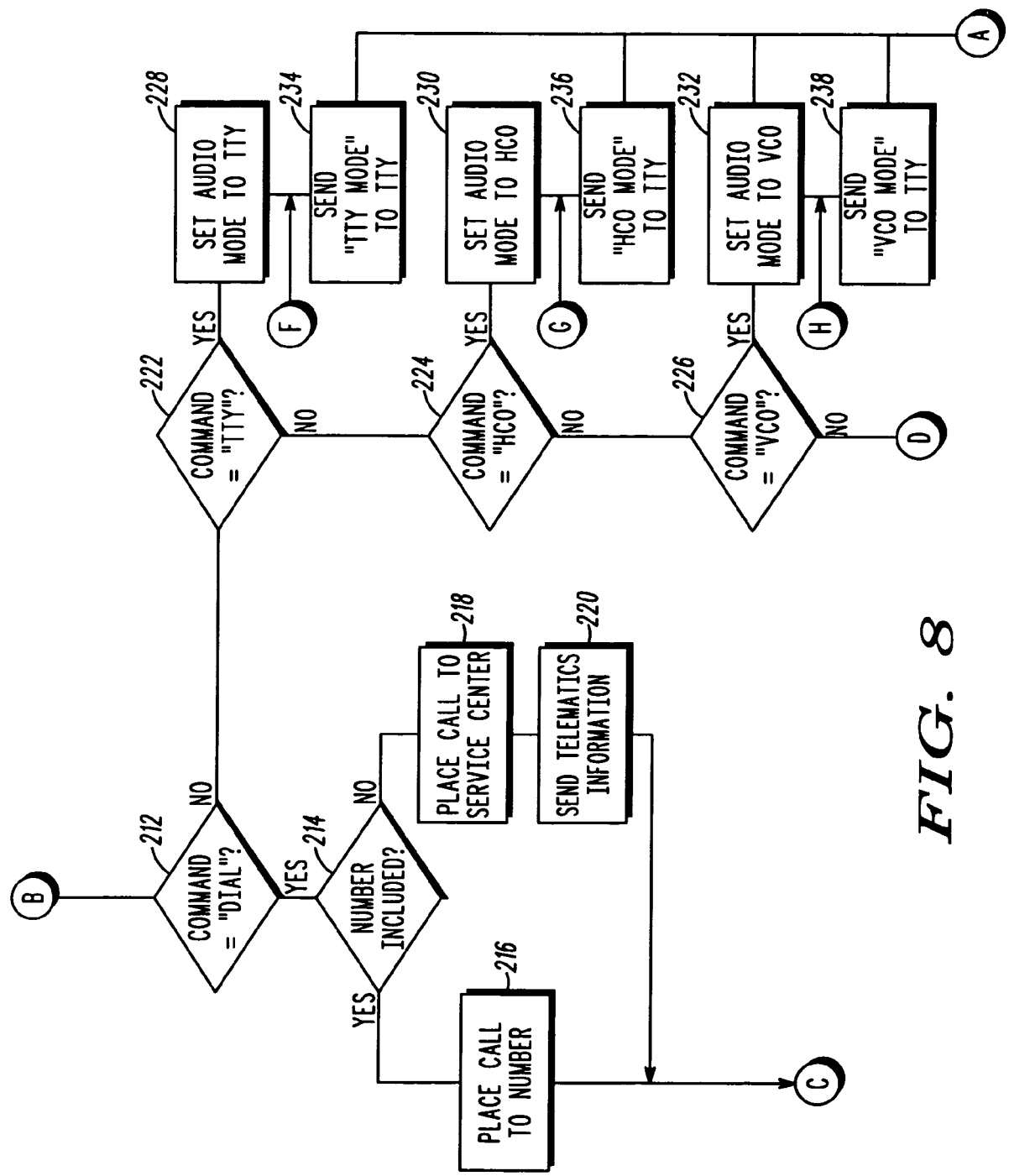

Referring initially to FIG. 7, a flow diagram is illustrated that shows one embodiment of a processing loop for communicating TTY information through the vehicle controller 36. In particular, at process block 202, the vehicle controller 36 would send a command so that a prompt would be displayed at the portable TTY terminal 50. The vehicle controller 36 may then be configured to be idle or wait until one of several events occurs. For instance, as shown in decision block 204, the process may proceed if the user enters information into the portable TTY terminal. Additionally, as shown in decision block 206, the process may proceed if the vehicle controller 36 receives an incoming data message (such as an SMS message). Further, as shown in decision block 208, the process may proceed if the vehicle controller 36 receives an incoming call over the wireless communication link A. Moreover, as shown in decision block 210, the process may proceed if the vehicle controller 36 receives vehicle information that needs to be provided to the user of the vehicle 20.

Starting initially with decision block 204, the vehicle controller 36 may be configured to wait for commands or other information provided by the user of the portable TTY terminal 50. For example, referring to decision block 212 in FIG. 8, the vehicle controller 36 determine whether the user desires to place a TTY call to a remote station. The system could be configured to place a TTY call after the user enters certain characters such as "DIAL" and the ENTER key on the keypad 54 of the portable TTY terminal 50. This would cause the portable TTY terminal 50 to send the information to the vehicle communication system 22. With regard to FIG. 4, the modem 37 in the vehicle communication system 22 would receive the appropriate TTY tones from the portable TTY terminal 50. The modem 37 would then demodulate the TTY tones and provide the "DIAL" command to the vehicle controller 36. With regard to FIG. 5, the vehicle communication system 22 could receive the commands directly over a separate control wire 43.

If the user desires to place a TTY call, the process may then proceed to decision block 214 where a determination is made whether a telephone number was included with the requested call. If a telephone number is provided, then the vehicle controller 36 will attempt to place a call to the desired telephone number as shown in process block 216. If the telephone number is not provided, then the vehicle controller 36 may attempt to place the call to a default telephone number associated with a remote station as shown in process block 218. Additionally, as shown in process block 220, the vehicle controller 36 may also send to the remote station any other information required for Telematics applications.

Figure 10:
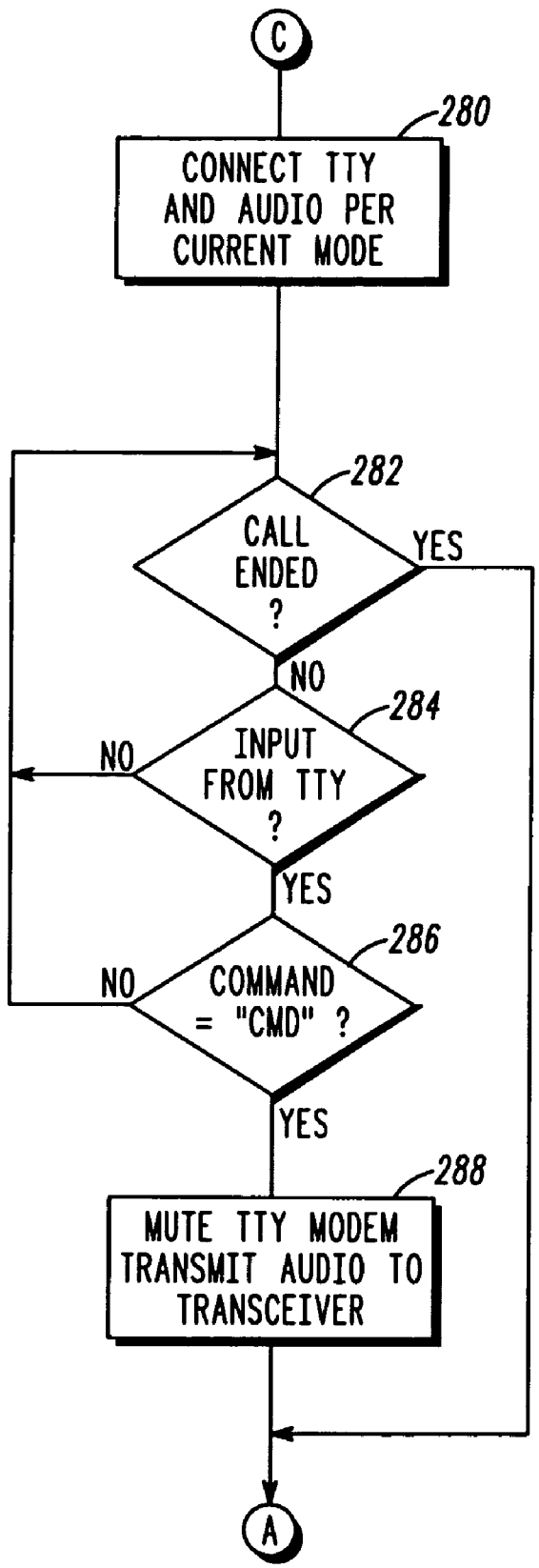

In either event, the process may continue as illustrated in FIG. 10. FIG. 10 describes a process flow within the vehicle controller 36 after a call has been established with a remote station. In particular, a call is established in process block 280 under one of the desired operation modes of the system (normal TTY mode, HCO mode, VCO mode). During a call, the process may enter into a loop that contains a variety of decision blocks 282, 284, 286.

At decision block 282, a determination may be made whether the call has ended. If the call has ended, the wireless communication link A between the vehicle communication system 22 and the remote station is terminated and the process returns back to block 202. If the call has not ended, the process may proceed to decision block 284.

At decision block 284, the vehicle controller 36 may make a determination whether there has been any input by the user at the portable TTY terminal 50. If the user has provided no input, the process may return to decision block 282. Otherwise, if user has provided input, the process may continue to decision block 286.

At decision block 286, the vehicle controller 36 may make a determination whether the user desires to send the controller a command. This can be accomplished by searching for a character string such as "CMD" from the portable TTY terminal 50. If the user does not desire to send the controller a command, then the process returns to decision block 282. Any characters entered by the user will be transmitted as part of the call. If, however, the user does desire to send the controller a command during a call, then the process proceeds to block 288 where the vehicle controller 36 will mute the TTY modems transmit audio to the transceiver 34. Process will continue back to block 202 where specific commands may be provided to the vehicle controller 36 from the portable TTY terminal 50.

Referring back to FIG. 8, the vehicle controller 36 may be further configured to allow the user to set the external interface to the normal TTY mode, the VCO mode, or the HCO mode by entering the characters "TTY", "HCO", or "VCO" as shown in decision blocks 222, 224, 226. The vehicle controller 36 may then configure the system to operate in one of the three modes as shown in process blocks 228, 230, 232 and described in more detail above. After configuring the system to operate in one of the three modes, the vehicle controller 36 may send the appropriate information to the portable TTY terminal 50 so that it can display the mode of operation as illustrated in process blocks 234, 236, 238. The process may then proceed back to process block 202.

Figure 9:
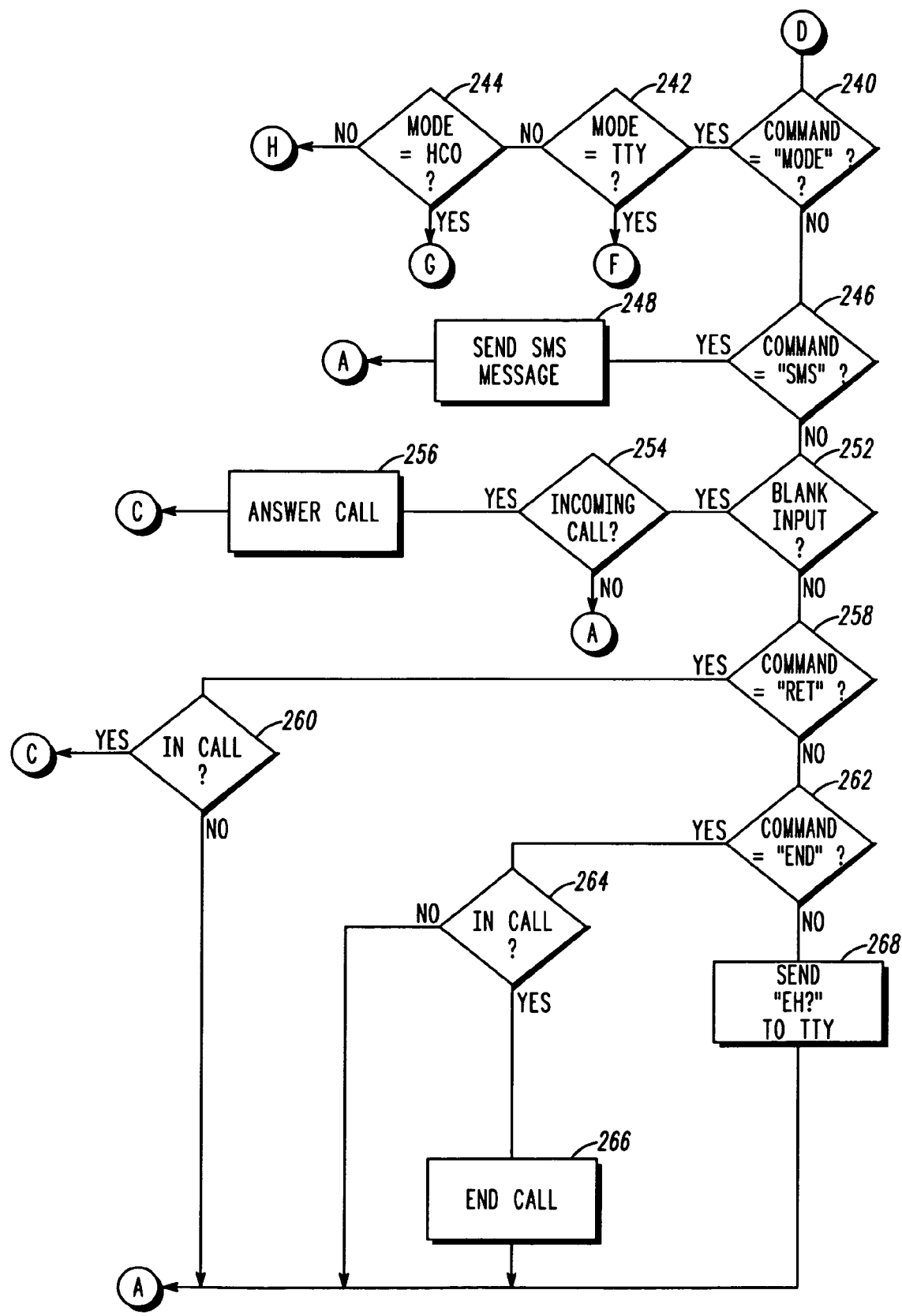

Additionally, the vehicle controller 38 may be configured to allow the user to query the vehicle controller 36 regarding the current mode of operation. For instance, the process may include a determination whether the user has entered the characters "MODE?" into the portable TTY terminal 50 as shown in decision block 240. In FIG. 9, if the user has entered the characters "MODE?" into the portable TTY terminal 50, then the vehicle controller 36 would determine the mode of operation as illustrated in decision blocks 242, 244 and the results reported to the user as performed in one of the reporting process blocks 234, 236, 238.

Alternatively, the portable TTY terminal 50 may be configured to issue the appropriate command strings such as those shown above when appropriate buttons or switches (such as mode switch 64) are activated.

The vehicle controller 36 may be further configured to allow the user to enter commands for the transmission of a data message. Short Message Service (SMS) is a type of data message used in cellular phones. As shown in decision block 246, the vehicle controller 36 may be configured to search for a string of characters such as "SMS" and transmit any associated message. For instance, the user may enter "SMS 888-555-1234 HI SALLY. DO YOU WANT TO MEET FOR COFFEE?". The vehicle controller 36 in process 248 would then parse the command and send the message ("HI SALLY. DO YOU WANT TO MEET FOR COFFEE?") via SMS to the portable device associated with the number 888-555-1234. Referring back to decision block 206 and process block 270, any incoming data messages received by the transceiver 34 could be sent to the portable TTY terminal 50. This would provide greater utility for the TTY terminal user by greatly increasing the number of other people that they could easily communicate with. The process may then proceed back to process block 202.

The vehicle controller 36 may be further configured to allow the user to accept an incoming call. For instance, at decision block 252, the vehicle controller 36 would determine whether a blank input was provided at the portable TTY terminal 50. This could be created when a user depresses the ENTER key on the keypad 54. If a blank input was provided, the vehicle controller 36 may then determine whether an incoming call is present as shown in decision block 254. If there is no incoming call, the process may then proceed back to block 202. Otherwise, if an incoming call is present, the vehicle controller 36 may then answer the incoming call as shown in process block 256.

The vehicle controller 36 may be further configured to allow the user to return to a connection with a remote station that has been suspended due to the user issuing the "CMD" command during the call. This command was described above with relation to process block 288 in FIG. 10. Here, at decision block 258, the vehicle controller 36 would determine whether certain characters such as "RET" were provided at the portable TTY terminal 50. If the user has entered the characters "RET", then the process continues to decision block 260 were a determination is made whether an existing call exists with a remote station over wireless communication link A. If so, the process continues back to the flow diagram in FIG. 10, as described in more detail above. If not, then the process may continue back to process block 202.

The vehicle controller 36 may be further configured to allow the user to end a call. In particular, at decision block 262, the vehicle controller 36 may make a determination whether the user has entered a string of characters such as "END". In response to receive the command "END", the vehicle controller 36 may then determine whether a call is in progress as shown in decision block 264. If a call is in process, the vehicle controller 36 may end the call as shown in block 266. If a call is not in progress, the process may return back to block 202.

If the vehicle controller 36 does not understand any string of characters or commands, the vehicle controller 36 may be configured to notify the user that the inputted information was not understood. In particular, as shown in process block 268, if none of the commands were understood, the vehicle controller 36 may send a response that is displayed on the portable TTY terminal 50 to indicate that the command was not understood by the vehicle controller 36.

Returning to decision block 204 in FIG. 7, if there is no user input from the portable TTY terminal 50, then the process may proceed to decision block 206 where the vehicle controller 36 may make a determination whether any incoming data messages have been received over the wireless communication link A. If an incoming data message is present, then the process may proceed to block 270 where the vehicle controller 36 sends the data message (such as an SMS message) to the portable TTY terminal 50. The process may then continue back to block 202. If there are no incoming data messages, then the process may proceed to decision block 208.

At decision block 208, the vehicle controller 36 may make a determination whether any incoming calls have been received over the wireless communication link A. If an incoming call is present, then the process may proceed to block 272 where the vehicle controller 36 sends a message to the portable TTY terminal 50 notifying the user that an incoming call exists. The message may include any Caller ID associated with the incoming call. The process may then continue back to block 202 and eventually to blocks 252, 254, 256 where the user may accept a call. If there are no incoming calls, then the process may proceed to decision block 210.

At decision block 210, the vehicle controller 36 may make a determination whether any vehicle information needs to be communicated to the user of the portable TTY terminal 50. For instance, the vehicle controller 36 may be connected to a vehicle's electronic control unit or vehicle's sensor bus. Any alerts or warnings received by the vehicle controller 36 may be communicated to the portable TTY terminal 50 in process block 274. The type of information may include alerts such as door ajar, low fuel, low oil, low tire pressure, headlights active, and so on. If there is no vehicle information to communicate to the user, then the process may proceed back to decision block 204.

Figure 11:
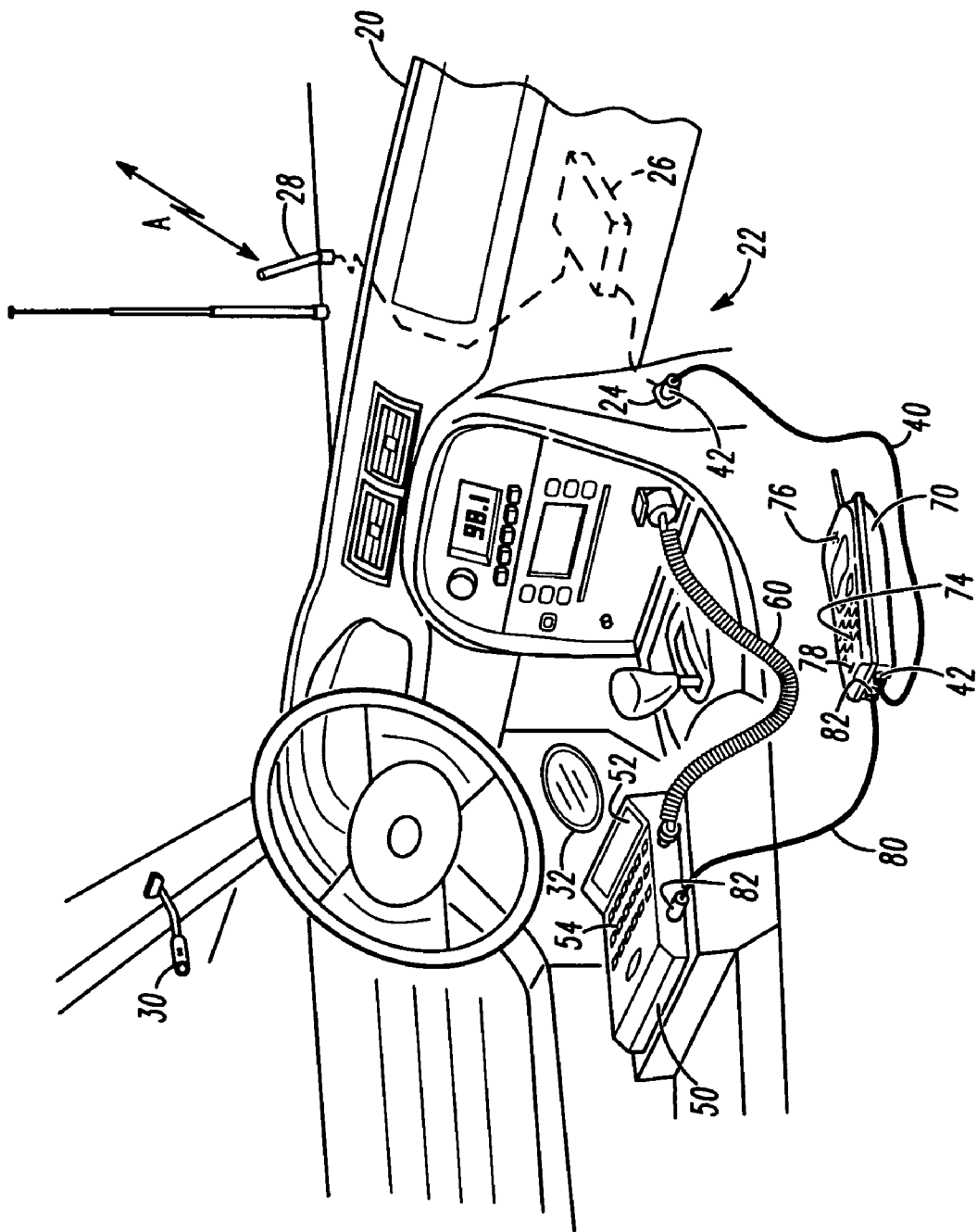
FIG. 11 is a perspective view of another embodiment of a communication system in a vehicle having the capability of transmitting and receiving teletype information.
Figure 12:
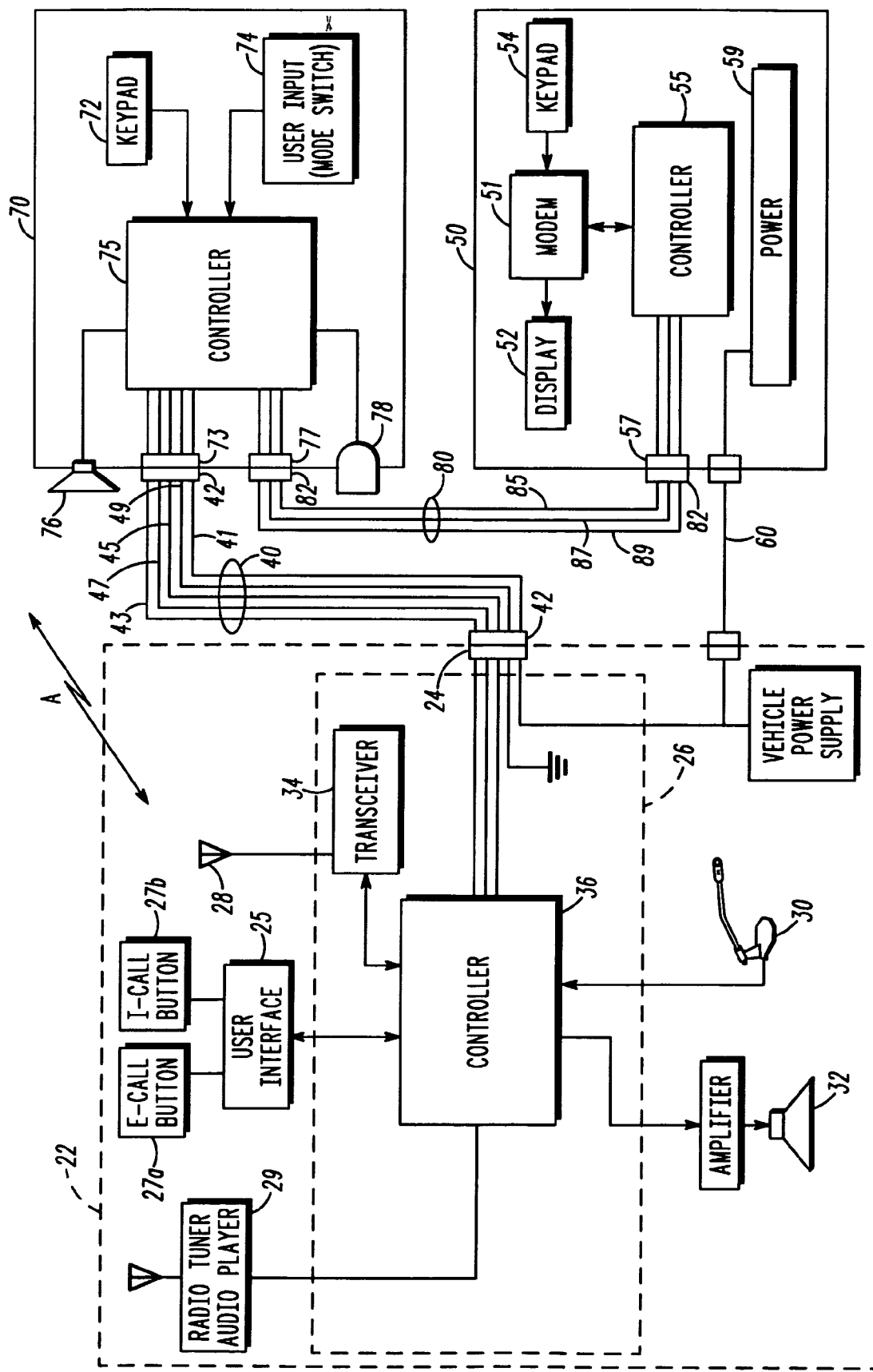
FIG. 12 is a block diagram of one embodiment of the system shown in FIG. 11.

FIGS. 11-12 illustrate another embodiment of a communication system 22 in a vehicle 20 having the capability of transmitting and receiving teletype information. In this embodiment, the external interface 24 embedded in the vehicle 20 may receive a first set of teletype signals from a portable TTY terminal 50 through a TTY terminal accessory 70. Additionally, the external interface 24 may send a second set of teletype signals to the portable TTY terminal 50 through the TTY terminal accessory 70. For the purposes of illustration and description, an example of a TTY terminal accessory 70 in the form of a cellular phone will be used. However, the present invention is not limited to cellular phones and the TTY terminal accessory 70 could be any type of adaptor box that allows for a serial communication link and having speaker and microphone functionality.

In this embodiment, the TTY terminal accessory 70 includes a keypad 72, a user input 74 with a mode switch, a controller 75, a speaker 76, and a microphone 78. The TTY terminal accessory 70 may also include external interfaces 73, 77. As will be explained further below, in this embodiment, the operational mode switch is included in the TTY terminal accessory 70 through a user input 74. Depending on the desired operational mode, the TTY terminal accessory 70 will assist in switching, transferring, or otherwise routing a communication to the correct destination.

The vehicle communication system 22 communicates with the TTY terminal accessory 70 through a communication cord 40 having a first wire 45, a second wire 47, a ground wire 49, a control wire 43, and a power wire 41. The communication cord 40 has connectors 42 at each end that plug into the interface 24 in the vehicle communication system 22 and the interface 73 in the TTY terminal accessory 70. In turn, the TTY terminal accessory 70 may communicate with the portable TTY terminal 50 through another communication cord 80 having a first wire 85, a second wire 87, and a ground wire 89. The communication cord 80 has connectors 82 at each end that plug into the interface 77 in the TTY terminal accessory 70 and the interface 57 in the portable TTY terminal 50.

As will be explained below, one benefit of this design is that it allows a user to enter call information through keypad 72 when establishing a wireless communication link A. This may be of particular importance to a vehicle communication system 22 that does not permit direct entry of call information through an embedded keypad. Moreover, this design is important for a portable TTY terminal 50 that, itself, does not allow for the receipt or transfer of control information through its external interface 57.

Another benefit of this design is that a user can take advantage of all three operational modes (normal TTY mode, VCO mode, and HCO mode) even though the portable TTY terminal 50 does not have a speaker or microphone. In particular, during the normal TTY mode, any text entered into the keypad 54 may be converted into a set of teletype signals by the modem 51 and then transferred to interface 57 for communication to the TTY terminal accessory 70 over the wire 85 in the communication cord 80. The controller 75 in the TTY terminal accessory 70 would then ensure that any teletype signals received through interface 77 from the portable TTY terminal 50 would be routed to interface 73. Accordingly, any teletype signals received from the portable TTY terminal 50 are sent to the vehicle communication system 22 over wire 45 in the communication cord 40. The vehicle communication system 22 would then receive the teletype signals and then generate messages over the wireless communication link A that contain the Baudot tones or other information representative of the tones. Additionally, the normal TTY mode would allow a user to read text of the conversation through the visual display 52 of the portable TTY terminal 50. This may be accomplished by the controller 75 when teletype signals received from the vehicle communication system 22 over wire 47 in communication cord 40 are transferred to the portable TTY terminal 50 over wire 87 in communication cord 80. The teletype signals received by the portable TTY terminal 50 are converted to text by the modem 51.

On the other hand, during the VCO mode, the controller 75 may send any audio information from microphone 78 to the vehicle communication system 22 over the wire 45 in the communication cord 40. Alternatively, in embodiments where the communication cord 40 allows the transmission of control information, the VCO mode may allow a user to provide audio information through the vehicle's microphone 30. Additionally, the VCO mode would allow a user to read text of the conversation through the visual display 52 of the portable TTY terminal 50. This may be accomplished by the controller 75 when teletype signals received from the vehicle communication system 22 over wire 47 in communication cord 40 are transferred to the portable TTY terminal 50 over wire 87 in communication cord 80. The teletype signals received by the portable TTY terminal 50 are converted to text by the modem 51.

Furthermore, during the HCO mode, any audio information transmitted by the vehicle communication system 22, over the wire 47 in the communication cord 40, may be heard through the speaker 76 in the TTY terminal accessory 70. Alternatively, in embodiments where the communication cord 40 allows the transmission of control information, the HCO mode may allow a user to receive audio information through the speaker 32 embedded in the vehicle 20. Additionally, the HCO mode would allow a user to enter text of the conversation through the keypad 54 in the portable TTY terminal 50. The text entered into the keypad 54 are converted into a set of teletype signals by the modem 51 and then transferred to interface 57 for communication to the TTY terminal accessory 70 over the wire 85 in the communication cord 80. The teletype signals received from the portable TTY terminal 50 are then sent to the vehicle communication system 22 over wire 45 in the communication cord 40. The vehicle communication system 22 would then receive the teletype signals and generate messages over the wireless communication link A that contain the Baudot tones or other information representative of the tones.

Figure 13:
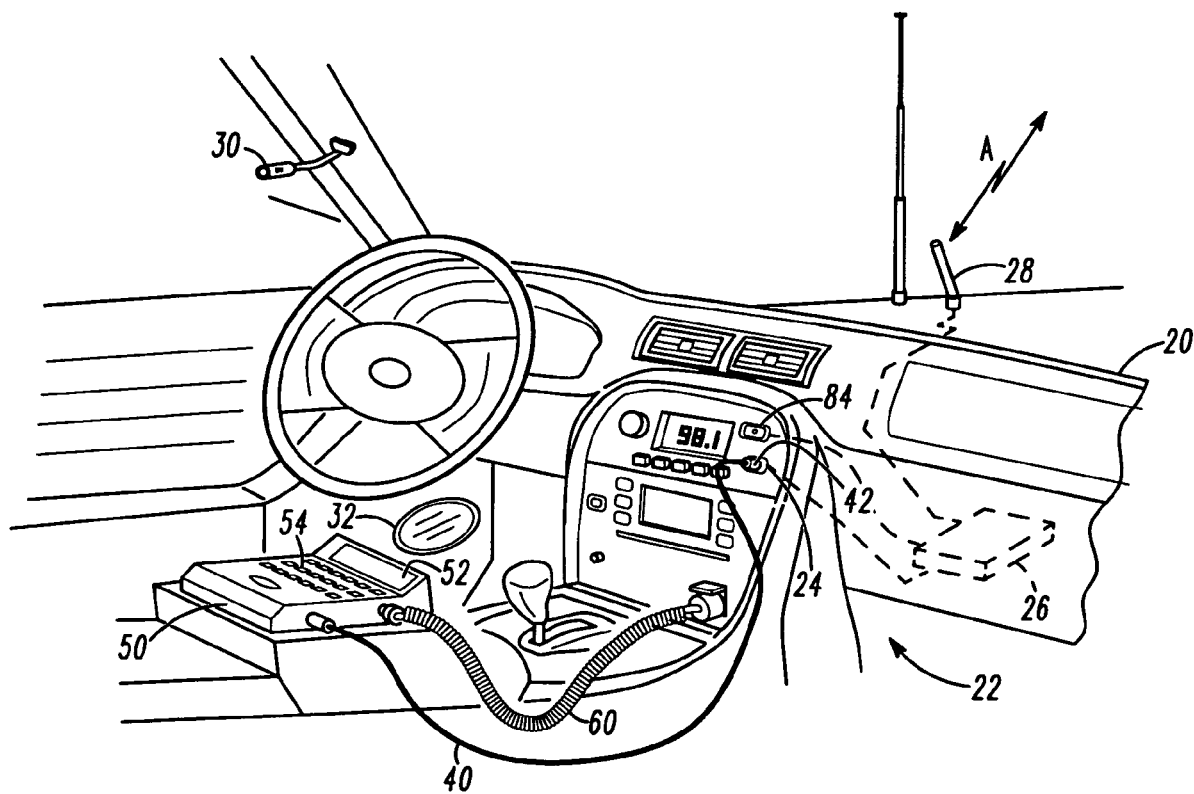
FIG. 13 is a perspective view of further embodiment of a communication system in a vehicle having the capability of transmitting and receiving teletype information.
Figure 14:
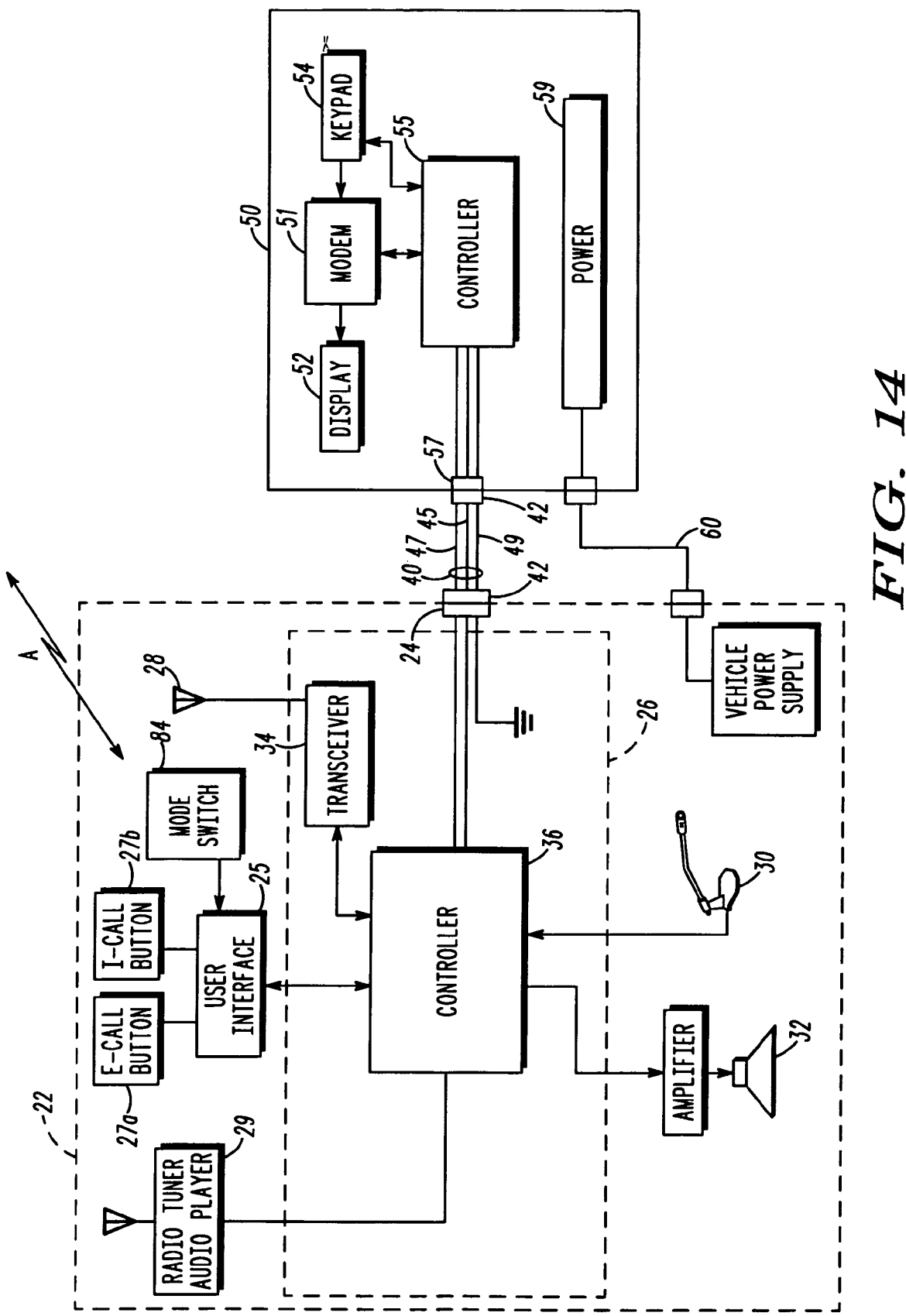
FIG. 14 is a block diagram of one embodiment of the system shown in FIG. 13.

FIGS. 13-14 illustrate another embodiment of a communication system 22 in a vehicle 20 having the capability of transmitting and receiving teletype information. In this embodiment, the external interface 24 embedded in the vehicle 20 may receive a first set of teletype signals from the portable TTY terminal 50 and may further send a second set of teletype signals to the portable TTY terminal 50. In this embodiment, however, an operational mode switch 84 is embedded in the vehicle 20 as part of the vehicle communication system 22. Depending on the desired operational mode, the vehicle controller 36 will switch, transfer or otherwise route the communication to the correct destinations.

In particular, the vehicle communication system 22 may communicate with the portable TTY terminal 50 through a communication cord 40 having a first wire 45, a second wire 47, and a ground wire 49. The communication cord 40 has connectors 42 at each end that plug into the external interface 24 in the vehicle communication system 22 and the external interface 57 in the portable TTY terminal 50.

Similar to the previous embodiment, one benefit of this design is that a user can take advantage of all three operational modes (normal TTY mode, VCO mode, and HCO mode) even though the portable TTY terminal 50 does not have a speaker or microphone. In particular, during the normal TTY mode, any text entered into the keypad 54 may be converted into a set of teletype signals by the modem 51 and then transferred to interface 57 for communication to the vehicle communication system 22 over wire 45 in the communication cord 40. The vehicle communication system 22 would then receive the teletype signals and then generate messages over the wireless communication link A that contain the Baudot tones or other information representative of the tones. Additionally, the normal TTY mode would allow a user to read text of the conversation through the visual display 52 of the portable TTY terminal 50. The vehicle communication system 22 transmits teletype signals over wire 47 in communication cord 40. The teletype signals received by the portable TTY terminal 50 are converted to text by the modem 51.

On the other hand, during the VCO mode, the vehicle controller 36 may direct any audio information from the vehicle's embedded microphone 30 to the transceiver 34 for transmission over the wireless communication link A. Additionally, the VCO mode would allow a user to read text of the conversation through the visual display 52 of the portable TTY terminal 50. This may be accomplished by the vehicle's controller 36 when it directs teletype signals to the portable TTY terminal 50 over wire 47 in communication cord 40. The teletype signals received by the portable TTY terminal 50 may then be converted to text by the modem 51.

Furthermore, during the HCO mode, the vehicle controller 36 may direct that any audio information received by the transceiver 34, over wireless communication link A, be heard through the vehicle's embedded speakers 32. Additionally, the HCO mode would allow a user to enter text of the conversation through the keypad 54 in the portable TTY terminal 50. The text entered into the keypad 54 are converted into a set of teletype signals by the modem 51 and then transferred to interface 57 for communication to the vehicle communication system 22 over wire 45 in the communication cord 40. The vehicle communication system 22 would then receive the teletype signals and generate messages over the wireless communication link A that contain the Baudot tones or other information representative of the tones.

FIGS. 1-5, 11-14 illustrate embodiments where the external interface 24 is a hard-wired connection. FIGS. 15-16 illustrate another embodiment of a communication system 22 in a vehicle 20 where the external interface 24 is configured for a wireless connection B. In particular, the communication system 22 includes a short-range transceiver 92 and the portable TTY terminal 50 includes a short-range transceiver 94. This allows for a wireless connection B between the vehicle communication system 22 and the portable TTY terminal 50. Accordingly, the external interface 24 uses the wireless connection B to receive a first set of signals from the portable TTY terminal 50 and to send a second set of signals to the portable TTY terminal 50.

In one embodiment, the short-range transmitters 92, 94 may be enabled using Bluetooth™ technology. Bluetooth technology allows for the replacement of a wired connection by enabling devices to communicate with each other through a universal short-range radio link. A Bluetooth specification is available on the Internet from the Bluetooth Special Interest Group (SIG) at www.bluetooth.com.

In a second embodiment, the short-range transmitters 92, 94 may be enabled using 802.11. 802.11 is a family of specifications for wireless local area networks (WLAN) developed by a working group of the Institute of Electrical and Electronics Engineers (IEEE). Alternatively, the short-range transmitters 92, 94 may be enabled using infrared communications under a protocol established by the Infrared Data Association (IrDA). The specification for one type of infrared communications is available on the Internet at www.irda.org.

The signals transferred between the vehicle communication system 22 and the portable TTY terminal 50 may include the Baudot tones in an audio format or may include digital messages that represent the Baudot tones. If the Baudot tones are transferred, then the wireless communication link B should be set to an audio format. For instance, using Bluetooth technology, the communication link may be set to the audio profile to transfer the Baudot tones. The transfer of the Baudot tones may require, however, a modem 37 in the vehicle communication system 22. The modem 37 would enable the vehicle controller 36 to communicate with the portable TTY terminal 50, similar to that described in relation to the embodiment in FIG. 4. If digital messages are transferred, then the short-range transceivers 92, 94 may require a coder/decoder for generating digital messages and regenerating the Baudot tones at each side of the communication link.

In either event, during the normal TTY mode, any text entered into the keypad 54 may be transferred to short-range transceiver 94 for transmittal over the wireless connection B. The vehicle communication system 22 would then receive the text and generate messages over the wireless communication link A that contain the text. Additionally, the normal TTY mode would allow a user to read text of the conversation through the visual display 52 of the portable TTY terminal 50. Through the vehicle's short-range transceiver 92, the vehicle communication system 22 transmits signals over the wireless connection B to the portable TTY terminal 50. The signals received by the portable TTY terminal 50 are shown on visual display 52.

On the other hand, during the VCO mode, the controller 55 in the portable TTY terminal 50 may transfer any audio information from the microphone 58, over the wireless connection B, to the transceiver 34 for transmission over the wireless communication link A. Alternatively, the controller 55 in the portable TTY terminal 50 may send a control signal to the vehicle controller 36, over the wireless connection B, to instruct the vehicle controller 36 to route any audio information from the vehicle's embedded microphone 30 to the transceiver 34 for transmission over the wireless communication link A. Additionally, the VCO mode would allow a user to read text of the conversation through the visual display 52 of the portable TTY terminal 50.

Furthermore, during the HCO mode, the controller 55 in the portable TTY terminal 50 direct any audio information received by the transceiver 34, over wireless connection B, to the terminal's speaker 56. Alternatively, the controller 55 in the portable TTY terminal 50 may transmit a control signal to the vehicle controller 36, over the wireless connection B, to instruct the vehicle controller 36 to route any downlink audio information received by the transceiver 34 to the vehicle's embedded speakers 32. Additionally, the HCO mode would allow a user to enter text of the conversation through the keypad 54 in the portable TTY terminal 50. The text entered into the keypad 54 are converted signals by the controller 55 and then transferred to the short-range transceiver 94 for communication to the vehicle communication system 22 over wireless connection B. The vehicle communication system 22 would then receive the signals and generate messages over the wireless communication link A that contain the tones or other information representative of the tones.

In a further embodiment, referring back to FIG. 3, the external interface 24 includes the vehicle microphone 30 and vehicle speakers 32. In that case, the teletype signals are transferred and received over the air to the portable TTY terminal 50 through sound waves. The portable TTY terminal 50 is configured to receive and send teletype signals from the vehicle microphone 30 and vehicle speakers 32. When receiving teletype signals from the vehicle speaker 32, the portable TTY terminal 50 receives the teletype signals through its microphone 58 and then uses its modem 51 to translate the audible tones into a text format that can displayed on display 52. When sending teletype signals to the vehicle microphone 30, the portable TTY terminal 50 takes text entered through keypad 54 and translates the text to audible tones that are then played on the terminal speaker 56. The vehicle microphone 30 will then receive the teletype signals and send them over the wireless communication link A.

What has been described is a communication system in a vehicle that includes the capability of transmitting and receiving teletype information for physically impaired persons. The system and method reduces the complexity and the number of distractions when answering or establishing an external wireless communication with a remote station. The system and method also allows a user to use a variety of operational modes even if the portable TTY terminal does not contain a speaker or microphone. The system and method further reduces cost because the transmission and reception of teletype information can be done without physically embedding a teletype device in the vehicle. A physically impaired person can use his or her own portable TTY terminal. The above description of the present invention is intended to be exemplary only and is not intended to limit the scope of any patent issuing from this application. The present invention is intended to be limited only by the scope and spirit of the following claims.

What is claimed is:

1. A method in a vehicle communication system for establishing a wireless communication link between the vehicle communication system and a remote station, the method comprising the steps of:
   sending a user prompt from the vehicle communication system to a portable text teletypewriter (TTY) terminal;
   determining at the vehicle communication system whether a user input is received from the portable TTY terminal;
   if a user input is received from the portable TTY terminal, determining whether the user input includes a dial command;
   if the user input includes a dial command, establishing the wireless communication link between the vehicle communication system and the remote station.

2. The method in claim 1 further comprising the steps of:
   determining whether the dial command includes a telephone number; and
   if the dial command includes a telephone number, establishing the wireless communication link between the vehicle communication system and the remote station based on the telephone number included in the dial command.

3. The method in claim 1 further comprising the steps of:
   determining at the vehicle communication system whether a second user input is received from the portable TTY terminal;
   if a second user input is received from the portable TTY terminal, determining whether the second user input includes an end call command; and
   if the second user input includes an end call command, terminating the wireless communication link between the vehicle communication system and the remote station.

4. The method in claim 1 further comprising the steps of:
   determining at the vehicle communication system whether an incoming data message exists; and
   if an incoming data message exists, sending the incoming data message from the vehicle communication system to the portable TTY terminal.

5. The method in claim 1 further comprising the steps of:
   determining at the vehicle communication system whether an incoming call exists;
   if an incoming call exists, sending a teletype message from the vehicle communication system to the portable TTY terminal notifying a user of the portable TTY terminal of the incoming call;
   determining at the vehicle communication system whether a second user input is received from the portable TTY terminal;
   if a second user input is received from the portable TTY terminal, determining whether the second user input includes an accept call command; and
   if the second user input includes an accept call command, establishing the wireless communication link between the vehicle communication system and the remote station.

6. The method in claim 1 further comprising the steps of:
   determining at the vehicle communication system whether a vehicle alert exists; and
   if a vehicle alert exists, sending a teletype message from the vehicle communication system to the portable TTY terminal notifying a user of the portable TTY terminal of the vehicle alert.

7. A method in a vehicle communication system for establishing a wireless communication link between the vehicle communication system and a remote station, the method comprising the steps of:
   determining at the vehicle communication system whether an incoming call exists;
   if an incoming call exists, sending a teletype message from the vehicle communication system to a portable text teletypewriter (TTY) terminal notifying a user of the portable TTY terminal of the incoming call;

determining at the vehicle communication system whether a user input is received from the portable TTY terminal;

if a user input is received from the portable TTY terminal, determining whether the user input includes an accept call command; and if the user input includes an accept call command, establishing the wireless communication link between the vehicle communication system and the remote station.

8. The method in claim 7 further comprising the steps of:

determining at the vehicle communication system whether a second user input is received from the portable TTY terminal;

if a second user input is received from the portable TTY terminal, determining whether the second user input includes an end call command; and if the second user input includes an end call command, terminating the wireless communication link between the vehicle communication system and the remote station.

9. The method in claim 1 wherein the step of establishing a wireless communication link between the vehicle communication system and the remote station includes a communication control unit that is embedded in the vehicle and directed to providing Telematics services to the occupant of the vehicle.

10. The method in claim 1 wherein the step of establishing a wireless communication link between the vehicle communication system and the remote station includes a communication control unit that is embedded in the vehicle, the communications control unit having a cellular transceiver that operates according to an analog wireless communication protocol.

11. The method in claim 1 wherein the step of establishing a wireless communication link between the vehicle communication system and the remote station includes a communication control unit that is embedded in the vehicle, the communications control unit having a cellular transceiver that operates according to a digital wireless communication protocol.

12. The method in claim 1 wherein the step of sending a user prompt from the vehicle communication system to the portable TTY terminal includes transmitting the signals over a removable communication cord that connects the portable TTY terminal to the vehicle.

13. The method in claim 1 wherein the step of sending a user prompt from the vehicle communication system to the portable TTY terminal includes transmitting the signals over a wireless communication link that connects the portable TTY terminal to the vehicle.

14. The method in claim 7 wherein the step of sending a teletype message from the vehicle communication system to the portable TTY terminal includes transmitting the signals over a removable communication cord that connects the portable TTY terminal to the vehicle.

15. The method in claim 7 wherein the step of sending a teletype message from the vehicle communication system to the portable TTY terminal includes transmitting the signals over a wireless communication link that connects the portable TTY terminal to the vehicle.

\* \* \* \* \*